United States Patent
Mitra et al.

(10) Patent No.: US 11,959,835 B2
(45) Date of Patent: Apr. 16, 2024

(54) PRELIMINARY DIAGNOSES OF CUT TISSUE SECTIONS

(71) Applicant: Clarapath, Inc., New York, NY (US)

(72) Inventors: Partha P. Mitra, New York, NY (US); Charles R. Cantor, New York, NY (US); Baris Yagci, New York, NY (US); Steven Smith, New York, NY (US)

(73) Assignee: Clarapath, Inc., Hawthorne, NY (US)

( * ) Notice: Subject to any disclaimer, the term of this patent is extended or adjusted under 35 U.S.C. 154(b) by 204 days.

(21) Appl. No.: 17/451,987

(22) Filed: Oct. 22, 2021

(65) Prior Publication Data

US 2022/0128810 A1 Apr. 28, 2022

Related U.S. Application Data

(60) Provisional application No. 63/104,907, filed on Oct. 23, 2020.

(51) Int. Cl.
*G01N 1/06* (2006.01)
*G01N 1/31* (2006.01)
(Continued)

(52) U.S. Cl.
CPC .............. *G01N 1/06* (2013.01); *G01N 1/312* (2013.01); *G02B 21/06* (2013.01); *G02B 21/26* (2013.01);
(Continued)

(58) Field of Classification Search
CPC ...... G02B 21/365; G02B 21/06; G02B 21/26; G02B 21/34; G01N 1/312;
(Continued)

(56) References Cited

U.S. PATENT DOCUMENTS

| 4,511,224 A | 4/1985 | Sitte et al. |
| 6,568,307 B1 | 5/2003 | Gunther |

(Continued)

FOREIGN PATENT DOCUMENTS

| CN | 212115045 U | 12/2020 |
| DE | 102011116555 A1 | 4/2013 |

(Continued)

OTHER PUBLICATIONS

International Search Report in PCT International Application No. PCT/US2022/056291 dated Jan. 24, 2022.

*Primary Examiner* — John R Schnurr
(74) *Attorney, Agent, or Firm* — Greenberg Traurig, LLP; David J. Dykeman; Roman Fayerberg

(57) ABSTRACT

A system for optical interrogation of tissue samples, the system including: a microtome configured to section one or more tissue sections from a tissue block, the one or more tissue sections including one or more tissue samples; a transfer medium configured to gather the one or more tissue sections and to transfer the one or more tissue sections to one or more slides; and an optical interrogation system including an illumination system configured to illuminate the one or more tissue sections and an imaging system configured to perform an imaging analysis on the one or more tissue sections illuminated with the illumination system.

18 Claims, 16 Drawing Sheets

(51) Int. Cl.
*G02B 21/06* (2006.01)
*G02B 21/26* (2006.01)
*G02B 21/36* (2006.01)
*G06T 7/00* (2017.01)

(52) U.S. Cl.
CPC .......... *G02B 21/365* (2013.01); *G06T 7/0012* (2013.01); *G06T 2207/10056* (2013.01); *G06T 2207/30024* (2013.01)

(58) Field of Classification Search
CPC .. G01N 2001/068; G01N 1/06; G06T 7/0012; G06T 2207/10056; G06T 2207/30024; G06T 2207/20084
See application file for complete search history.

(56) References Cited

U.S. PATENT DOCUMENTS

| | | | |
|---|---|---|---|
| 7,374,907 | B1 | 5/2008 | Voneiff et al. |
| 8,074,547 | B2 | 12/2011 | Ito et al. |
| 8,687,858 | B2 | 4/2014 | Walter et al. |
| 9,032,854 | B2 | 5/2015 | Yang et al. |
| 9,164,014 | B2 | 10/2015 | Ito |
| 9,279,749 | B2 | 3/2016 | Donovan et al. |
| 9,354,147 | B2 | 5/2016 | Lefebvre |
| 9,933,339 | B2 | 4/2018 | Briggman |
| 10,473,557 | B2 | 11/2019 | Mitra et al. |
| 10,571,368 | B2 | 2/2020 | Zhang et al. |
| 10,724,929 | B2 | 7/2020 | Zhang et al. |
| 11,169,056 | B2 | 11/2021 | Mitra et al. |
| 11,435,268 | B2 | 9/2022 | Mitra et al. |
| 11,467,071 | B2 | 10/2022 | Mitra et al. |
| 11,506,577 | B2 | 11/2022 | Zhang et al. |
| 11,609,162 | B2 | 3/2023 | Mitra et al. |
| 11,630,035 | B2 | 4/2023 | Mitra et al. |
| 2003/0022271 | A1 | 1/2003 | Voneiff et al. |
| 2003/0120633 | A1 | 6/2003 | Torre-Bueno |
| 2005/0235542 | A1 | 10/2005 | Metzner et al. |
| 2006/0086221 | A1 | 4/2006 | Kong |
| 2007/0039435 | A1 | 2/2007 | Kokubo |
| 2007/0141711 | A1 | 6/2007 | Stephens et al. |
| 2007/0180965 | A1* | 8/2007 | Ito .................... G01N 1/06 700/109 |
| 2007/0199418 | A1 | 8/2007 | Ito |
| 2009/0110253 | A1 | 4/2009 | Torre-Bueno |
| 2009/0214088 | A1 | 8/2009 | Sorenson et al. |
| 2010/0021037 | A1 | 1/2010 | Zahniser et al. |
| 2010/0118133 | A1 | 5/2010 | Walter et al. |
| 2010/0279342 | A1 | 11/2010 | Kijima et al. |
| 2011/0111435 | A1* | 5/2011 | Dobson .............. G01N 33/74 435/7.23 |
| 2011/0249109 | A1 | 10/2011 | Fine et al. |
| 2011/0303352 | A1 | 12/2011 | Nakajima et al. |
| 2012/0149050 | A1 | 6/2012 | Lapen et al. |
| 2013/0164781 | A1 | 6/2013 | Lefebvre |
| 2014/0026683 | A1 | 1/2014 | Hayworth et al. |
| 2014/0041500 | A1 | 2/2014 | Isagawa et al. |
| 2014/0051158 | A1 | 2/2014 | Nakajima et al. |
| 2014/0098376 | A1 | 4/2014 | Hashimshony |
| 2014/0137715 | A1 | 5/2014 | Sneyders et al. |
| 2015/0013512 | A1 | 1/2015 | Yang et al. |
| 2015/0017679 | A1 | 1/2015 | Ito et al. |
| 2015/0268141 | A1 | 9/2015 | Miyatani |
| 2015/0293026 | A1 | 10/2015 | Shin et al. |
| 2016/0063724 | A1 | 3/2016 | Tunstall et al. |
| 2016/0091400 | A1 | 3/2016 | Whited et al. |
| 2016/0139004 | A1 | 5/2016 | Witte |
| 2017/0003309 | A1 | 1/2017 | Mitra et al. |
| 2017/0067800 | A1* | 3/2017 | Briggman ............... H01J 37/26 |
| 2017/0205317 | A1 | 7/2017 | Zhang et al. |
| 2017/0276574 | A1 | 9/2017 | Webber et al. |
| 2017/0328818 | A1 | 11/2017 | Zhang et al. |
| 2018/0136089 | A1 | 5/2018 | Bui et al. |
| 2019/0176194 | A1 | 6/2019 | Chen et al. |
| 2019/0250071 | A1 | 8/2019 | Hayworth et al. |
| 2020/0041387 | A1 | 2/2020 | Rhodes et al. |
| 2020/0064232 | A1 | 2/2020 | Mitra et al. |
| 2020/0160522 | A1 | 5/2020 | Merlo et al. |
| 2020/0166434 | A1 | 5/2020 | Zhang et al. |
| 2020/0388032 | A1 | 12/2020 | Chiang et al. |
| 2021/0262905 | A1 | 8/2021 | Mitra et al. |
| 2021/0262907 | A1 | 8/2021 | Mitra et al. |
| 2021/0263055 | A1 | 8/2021 | Mitra et al. |
| 2022/0034768 | A1 | 2/2022 | Mitra et al. |
| 2022/0034769 | A1 | 2/2022 | Mitra et al. |
| 2022/0042887 | A1 | 2/2022 | Mitra et al. |
| 2022/0113228 | A1 | 4/2022 | Mitra et al. |
| 2022/0349788 | A1 | 11/2022 | Mitra et al. |
| 2022/0364960 | A1 | 11/2022 | Smith et al. |
| 2022/0404241 | A1 | 12/2022 | Yagci et al. |
| 2023/0057075 | A1 | 2/2023 | Zhang et al. |
| 2023/0126618 | A1 | 4/2023 | Mitra et al. |
| 2023/0221222 | A1 | 7/2023 | Mitra et al. |

FOREIGN PATENT DOCUMENTS

| | | |
|---|---|---|
| DE | 10207118304 A1 | 2/2018 |
| EP | 0111290 A2 | 6/1984 |
| JP | S6385426 A | 4/1988 |
| JP | 2000190291 A | 7/2000 |
| JP | 2001324423 A | 11/2001 |
| JP | 2004013435 A | 1/2004 |
| JP | 2012229993 A | 11/2012 |
| JP | 2012229995 A | 11/2012 |
| JP | 2007218616 A | 1/2015 |
| WO | 1997003827 A1 | 2/1997 |
| WO | WO 2010151761 A2 | 12/2010 |
| WO | WO 2012147730 A1 | 11/2012 |
| WO | WO 2015046518 A1 | 4/2015 |
| WO | WO 2015175525 A1 | 11/2015 |
| WO | WO 2021168457 A1 | 8/2021 |
| WO | WO 2022087443 A1 | 4/2022 |
| WO | 2022241261 A1 | 11/2022 |
| WO | 2022271732 A1 | 12/2022 |
| WO | 2023092156 A1 | 5/2023 |
| WO | 2023122620 A2 | 6/2023 |

* cited by examiner

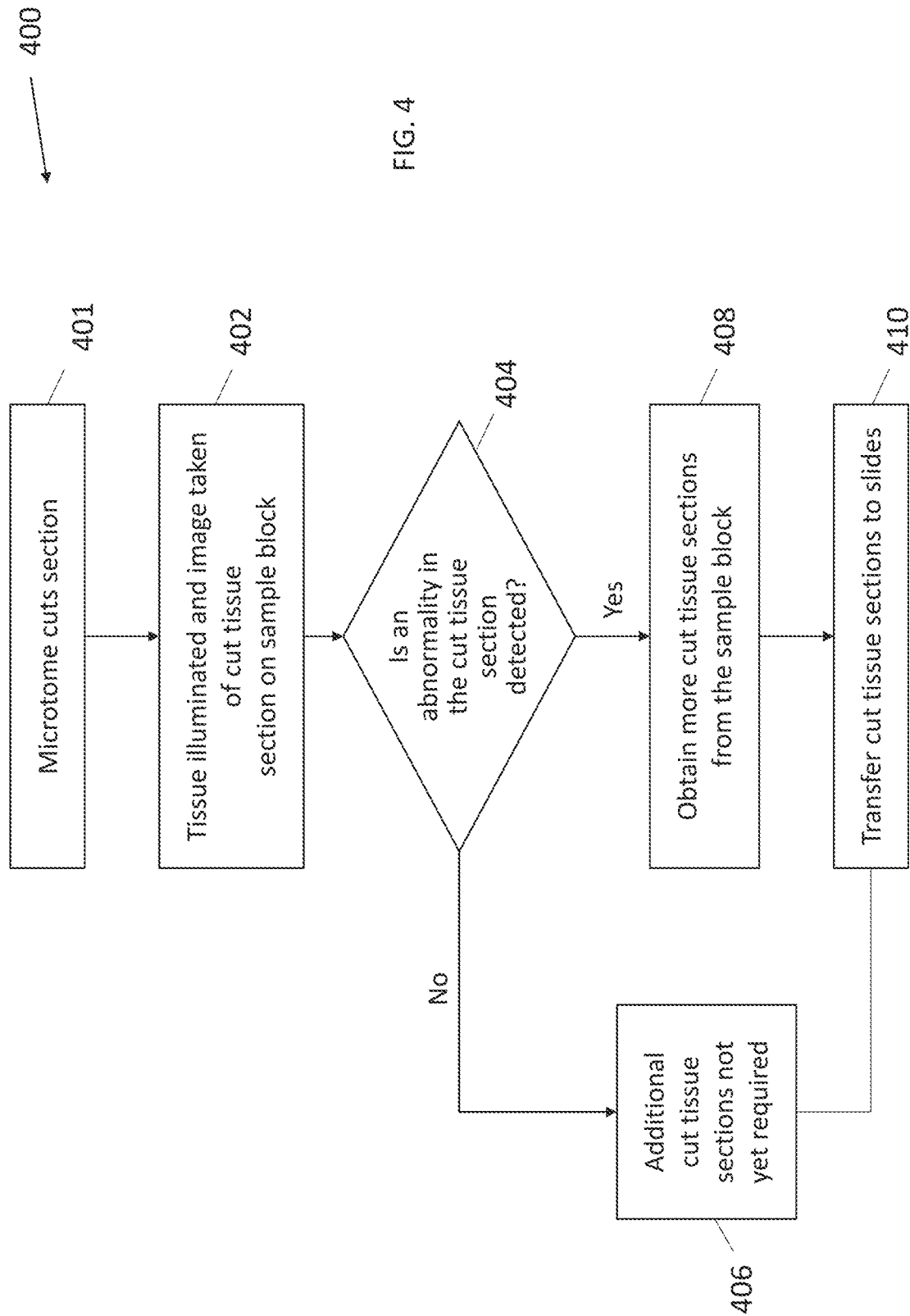

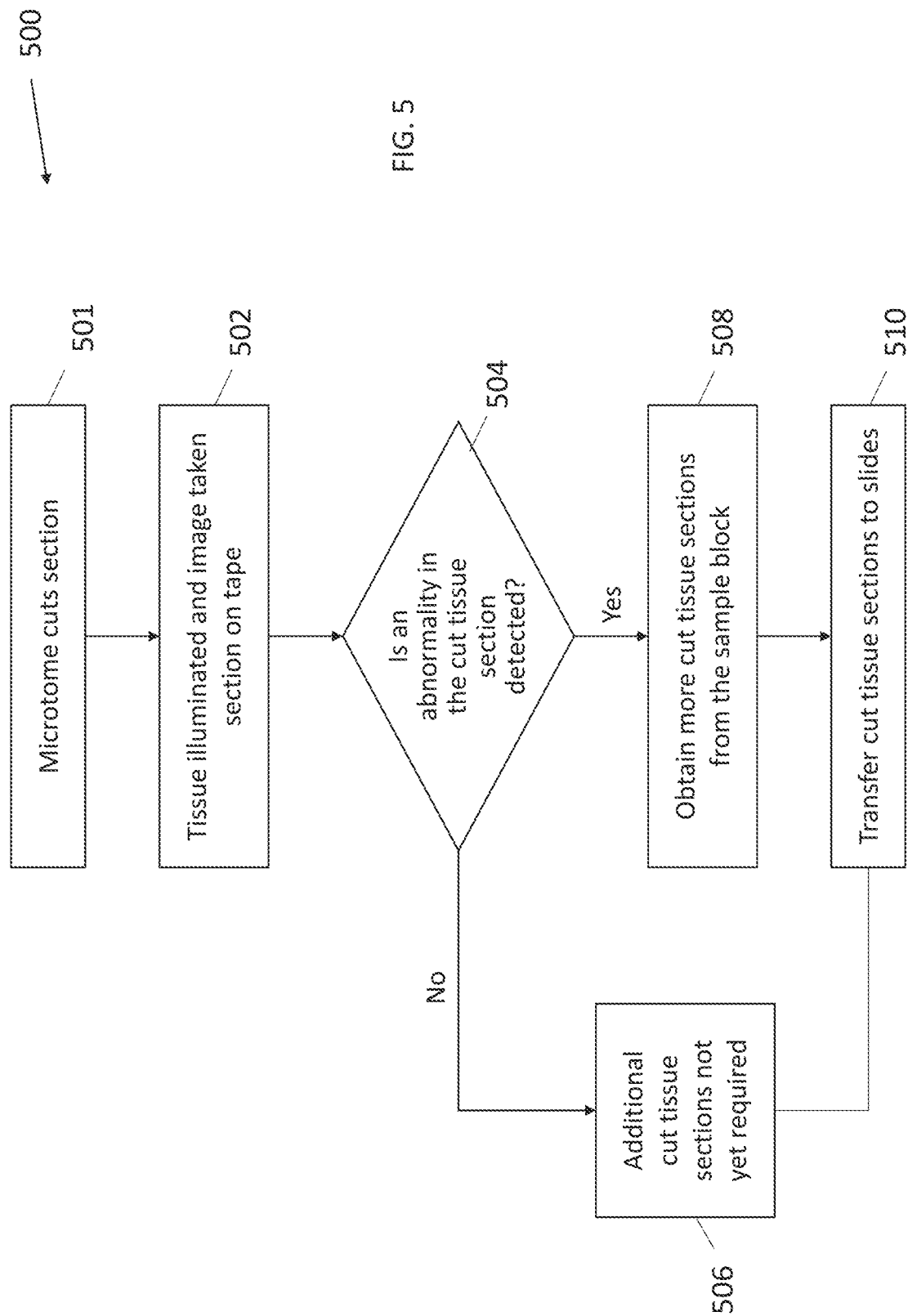

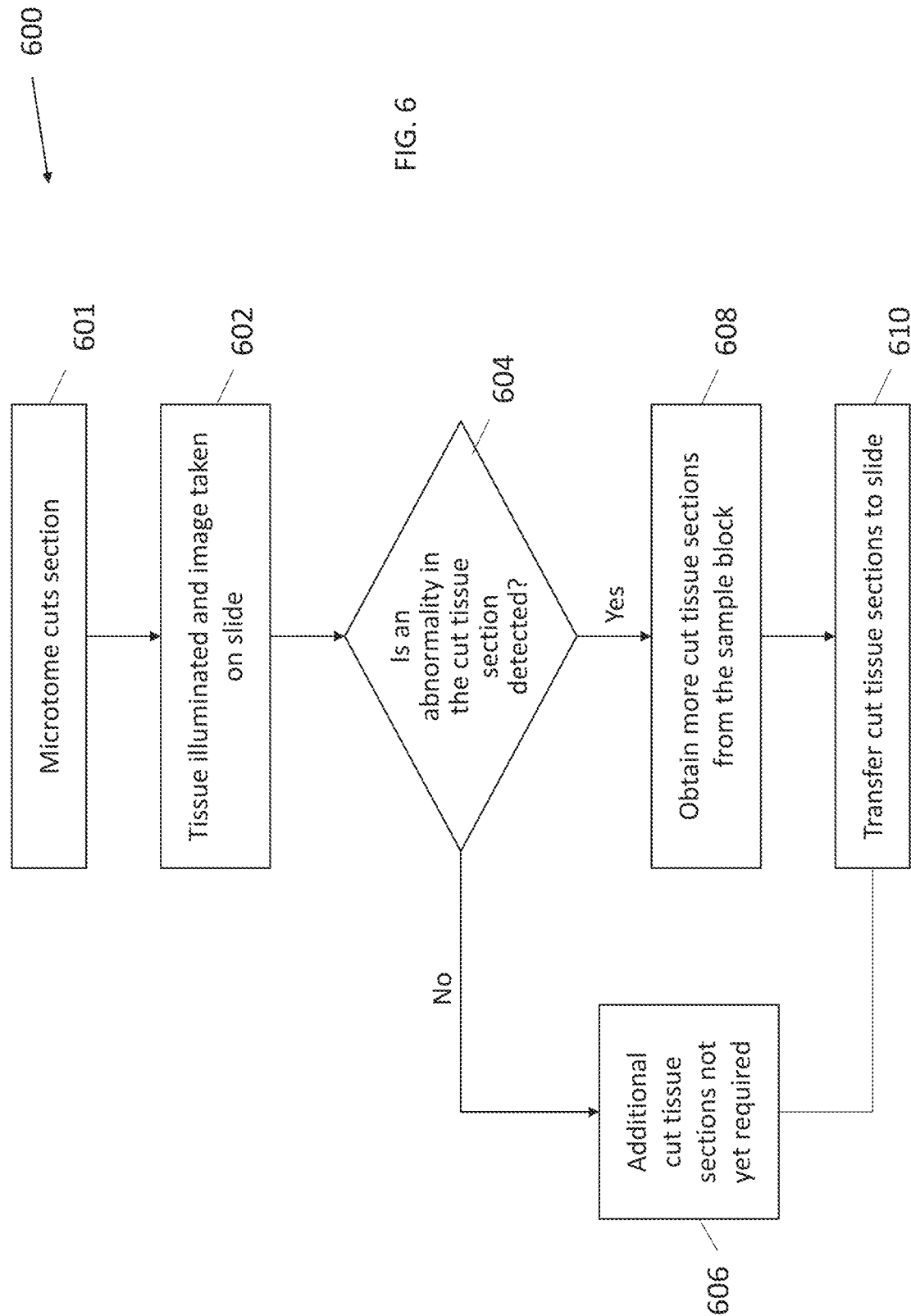

PRELIMINARY DIAGNOSES OF CUT TISSUE SECTIONS

RELATED APPLICATIONS

This application claims the benefit of and priority to U.S. Provisional Patent Application No. 63/104,907 filed Oct. 23, 2020, the contents of which are incorporated herein by reference in their entirety.

FIELD

The present disclosure relates to systems and methods for preliminary diagnoses of abnormalities in tissue samples from a sample block of tissue based on an optical interrogation of the intrinsic tissue properties. In some embodiments, such systems and methods can be used in an automated histology apparatus.

BACKGROUND

Traditional microtomy, the production of postage-stamp sized, micron-thin tissue sections for microscope viewing, is a delicate, time consuming manual task. In the process, a microtome cuts a tissue block consisting of tissue sample, enclosed in a supporting block of embedding material such as paraffin wax. The microtome holds a blade aligned for cutting slices from one face of tissue block—the block cutting face. A common type, the rotary microtome, linearly oscillates a chuck holding the block with the cutting face in the blade-cutting plane. Combined with incremental advancement of the block cutting face into the cutting plane, the microtome successively shaves thin tissue sections off the block cutting face. For sections with paraffin wax embedding medium, an operator carefully picks up these tissue sections and floats them on warm water. The water gently de-wrinkles and reduces deformation from cutting. Finally, an operator moves the sections from water onto microscope slides for further processing.

In the normal pathology workflow, diagnoses are performed after the tissue samples cut from the sample block are placed on slides, stained and subsequently imaged to detect abnormalities, e.g., cancer cells. Thus, in the current processes, the cut tissue sections, after being transferred to slides, are stained with H&E (hematoxylin and eosin) and evaluated in the pathology lab. If problems with the tissue are detected, e.g., cancer cells detected, new tests are ordered. Oftentimes it takes one to two days between the initial assessment in the lab of the stained tissue and obtaining the additional slides in a subsequent sectioning. It would be advantageous to speed up this process and enable the system or the user to identify any abnormalities in the tissue earlier in the process.

SUMMARY

The present disclosure overcomes the problems and deficiencies of the prior art.

In some aspects, the present disclosure provides a system for optical interrogation of tissue samples, the system including: a microtome configured to section one or more tissue sections from a tissue block, the one or more tissue sections including one or more tissue samples; a transfer medium configured to gather the one or more tissue sections and to transfer the one or more tissue sections to one or more slides; and an optical interrogation system including an illumination system configured to illuminate the one or more tissue sections and an imaging system configured to perform an imaging analysis on the one or more tissue sections illuminated with the illumination system.

In some aspects, the present disclosure provides a system, wherein the illumination system is configured to illuminate the one or more tissue sections with structured light. In some aspects, the present disclosure provides a system, wherein the imaging system is configured to perform the imaging analysis with light microscopic resolution. In some aspects, the present disclosure provides a system, wherein the imaging system includes a microscopic scanner. In some aspects, the present disclosure provides a system, wherein the optical interrogation system is mounted on a moveable stage such that the imaging analysis of the one or more tissue sections is performed at the microtome, on the transfer medium, or on the one or more slides.

In some aspects, the present disclosure provides a system for optical interrogation of tissue samples, the system including: a microtome configured to section one or more tissue sections from a tissue block, the one or more tissue sections including one or more tissue samples; an optical interrogation system including an illumination system configured to illuminate the one or more tissue sections and an imaging system configured to perform an imaging analysis of the one or more tissue sections illuminated with the illumination system; and a processor in communication with the optical interrogation system, the processor being programmed to receive imaging data indicative of the imaging analysis from the optical interrogation system and to present the imaging data for an analysis of the one or more tissue sections to determine a presence or an absence of one or more abnormalities.

In some aspects, the present disclosure provides a system, wherein the processor is programmed to perform an analysis of the imaging data to determine a presence or an absence of one or more abnormalities in the one or more tissue samples of the one or more tissue sections. In some aspects, the present disclosure provides a system further including a transfer medium configured to gather the one or more tissue sections and to transfer the one or more tissue sections to one or more slides. In some aspects, the present disclosure provides a system, wherein one or more abnormalities include one or more biomarkers indicative of a disease, a quality control issue or a combination thereof. In some aspects, the present disclosure provides a system, wherein the processor is programmed to perform a diagnostic algorithm to generate a diagnostic value for the one or more tissue samples. In some aspects, the present disclosure provides a system, the diagnostic value being indicative of a presence or an absence of a disease.

In some aspects, the present disclosure provides a system, wherein the processor is further programmed to obtain additional one or more tissue sections if the diagnostic value is indicative of the presence of a disease. In some aspects, the present disclosure provides a system, wherein the processor is configured to identify from the imaging data one or more biomarkers indicative of a disease in the one or more tissue samples and assign a diagnostic value for the one or more tissue samples based on the one or more biomarkers. In some aspects, the present disclosure provides a system, wherein the processor is programmed to perform a quality control algorithm to identify one or more quality control issues. In some aspects, the present disclosure provides a system, wherein the illumination system is configured to illuminate the one or more tissue sections with structured light. In some aspects, the present disclosure provides a system, wherein the imaging system is configured to perform the imaging analysis with light microscopic resolution. In some aspects, the present disclosure provides a system, wherein the imaging data includes one or more images of the one or more tissue sections. In some aspects, the present disclosure provides a system, wherein the processor is configured to present to a human user the imaging data as one or more images of the one or more tissue sections.

In some aspects, the present disclosure provides a system for optical interrogation of tissue samples, the system including: a microtome configured to section one or more tissue sections from a tissue block, the one or more tissue sections including one or more tissue samples; a transfer medium configured to gather the one or more tissue sections and to transfer the one or more tissue sections to one or more slides; an optical interrogation system including an illumination system configured to illuminate the one or more tissue sections and an imaging system configured to perform an imaging analysis on the one or more tissue sections illuminated with the illumination system; and a processor being programmed to receive imaging data indicative of the imaging analysis from the optical interrogation system, to perform an analysis of the one or more tissue samples for one or more biomarkers indicative of a disease, and to cause the microtome to section additional one or more tissue sections if the one or more biomarkers are detected.

In some aspects, the present disclosure provides a method for optical interrogation of tissue samples, the method including: sectioning, using a microtome, one or more tissue sections from a tissue block, one or more tissue sections including one or more tissue samples; transferring, using an automated transfer medium, the one or more tissue sections from the microtome to one or more slides; illuminating, by an illumination system, the one or more tissue sections; and performing, by an imaging system, an imaging analysis to collect imaging data on the one or more tissue sections illuminated by the illumination system.

In some aspects, the present disclosure provides a method further including presenting the imaging data to one or more users as one or more images of the one or more tissue section. In some aspects, the present disclosure provides a method further including presenting to a human user one or more images of the one or more tissue sample after the tissue sample is stained. In some aspects, the present disclosure provides a method further including receiving, by a processor, imaging data indicative of the imaging analysis and analyzing, by the processor, the tissue sample to determine a presence or an absence of one or more abnormalities in the one or more tissue samples. In some aspects, the present disclosure provides a method further including performing, by the processor, a diagnostic algorithm to generate a diagnostic value for the one or more tissue samples indicative of a presence or an absence of a disease in the one or more tissue samples and presenting the diagnostic value to a human user together with one or more images of the one or more tissue sections. In some aspects, the present disclosure provides a method further including performing, by the processor, a diagnostic algorithm to generate a diagnostic value for the one or more tissue samples indicative of a presence or an absence of a disease.

BRIEF DESCRIPTION OF THE DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein:

FIGS. 4-6 provide flow charts illustrating various non-limiting examples of the methods in accordance with the present disclosure;

Figure 1:
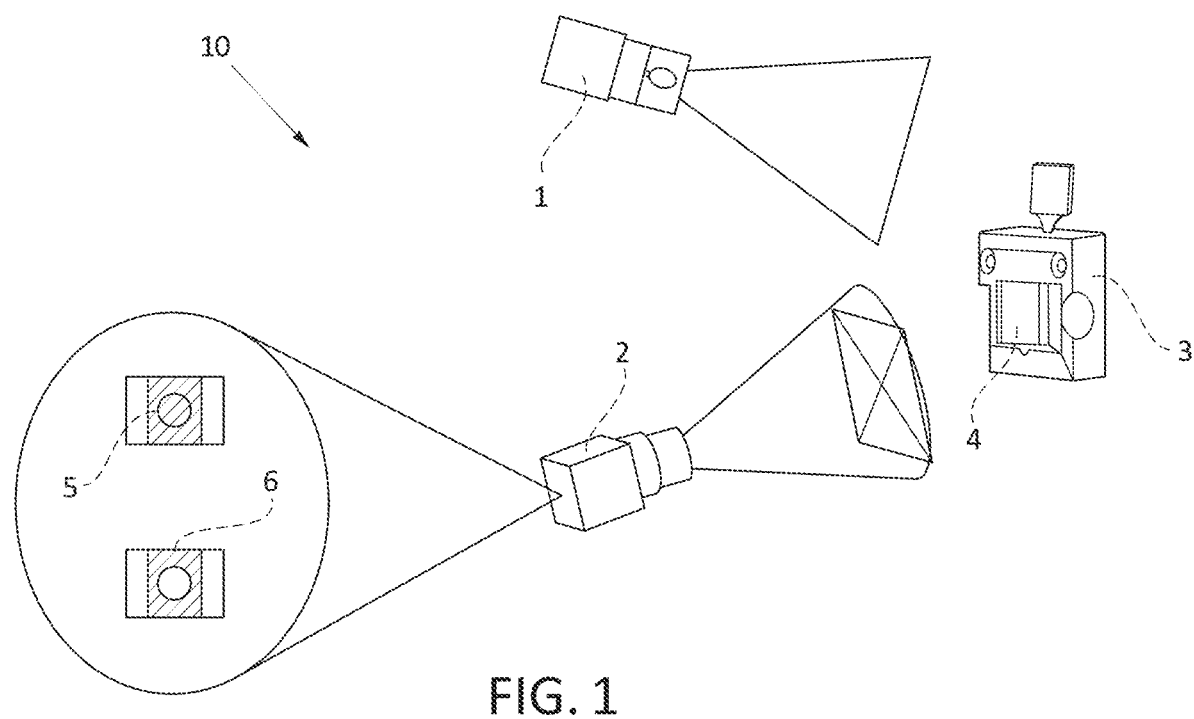
FIGS. 1, 2 and 3 illustrate embodiments of a lighting and imaging system of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure provides systems and methods for optical interrogation of a tissue sample without chemical staining or labeling of the tissue during the preparation of tissue samples in a histology process. The presently disclosed methods and systems can be used either in a manual, semi-automated fashion or in a fully automated histology process to perform an imaging analysis of the unstained tissue samples. The imaging analysis is performed, for example, to obtain imaging data indicative of one or more images of the illuminated tissue section using the imaging system. The imaging data may be an actual image of the tissue sample or data indicative of an image, for example, data that can be used to recreate an image of the tissue sample, and the terms can be used interchangeably. Based on the imaging data, decisions about further procession of the tissue sample can be made, either by a human user or by a computer system. Such decisions can be made based on the imaging data alone or in combination with other information about the tissue sample.

In some embodiments, the systems and method of the present disclosure may provide one or more images of the tissue sample that can be used to diagnose a disease or condition. Note that the term "diagnosis" as used herein denotes the singular, e.g., a single disease, but also encompasses more than one, e.g., multiples diseases as in the term "diagnoses." In some embodiments, the interrogation systems and methods of the present disclosure enable information relevant to diagnosis, e.g., presence of a tumor, to be extracted from the tissue during the slide preparation process, e.g., tissue sectioning. In some embodiments, the presently disclosed systems can be used to determine if the tissue section suffers from one or more quality issues (not sufficient tissue sample, not intact tissue sample etc.). The systems and methods use the intrinsic tissue properties without any staining or special treatment, such as labeling the tissue with fluorescent signals, to render a preliminary diagnosis. This provides a preliminary quick set of information during the preparation of the tissue samples, which can help to prioritize the tissue samples for processing, thereby speeding up diagnosis time for cases where an abnormality is already visible in the unstained image. The information from the unstained/untreated tissue image can be integrated with the information from the downstream stained section which can speed up computer aided diagnostics. Thus, the optical imaging methods for computer aided diagnostics can be integrated into the automated apparatus. Due to the analysis of the tissue at different stages in the process in some embodiments, e.g., block to new slice, slice on transport, slice on slide, multiple internal levels of tissue interrogation can be provided.

In some embodiments, the diagnosis can be performed by a human user. The methods and systems of the present disclosure can speed up the process of tissue sample preparation that involves, multiple rounds of tissue sectioning, staining, and analysis. Because the instant methods and systems can provide images to the human user (for example, a pathologist), while section is still in the early stages of being processed, the human user, for example, can ask for additional testing (staining or molecular testing). This can speed up the diagnostics process which improves the health outcomes for the patients.

The present disclosure provides a system and process for preliminary diagnoses of tissue sections by a computer system, a human user, or both from a tissue sample block without chemically staining or otherwise labeling of the tissue. In some embodiments, the methods and systems of the present disclosure utilize optical methods during the preparation of histology slides, for example, at the block face, during tape transfer, or on the slide, to obtain and to interpret imaging data of unstained tissue to aid diagnoses. This can be referred to as optical staining and can be used to extract diagnostic information at an earlier stage of the slide preparation process, for example, during sample sectioning or slide preparation. However, in some embodiments, the present methods and systems rely on the intrinsic tissue properties (for example, endogenous fluorophores present in tissue), without any staining or special treatment. The intrinsic tissue properties are used without any staining or special treatment, thus speeding up the process. In other words, sections of the natural unstained tissue can be analyzed using various optical interrogation techniques. In this manner, a preliminary quick set of information from the automated device is provided during the sectioning process, which helps prioritize samples for processing, thus speeding up diagnostics time for cases where an abnormality is already visible in the unstained image. Additionally, integrating the unstained section information with downstream stained-section information could speed up the final computer aided diagnostics (CAD). In some embodiments, the preliminary diagnoses system/process is integrated into an automated tissue transfer system which utilizes tape (or other transfer medium) to transport tissue sections cut by a microtome from a tissue sample block to microscope slides.

In some embodiments, the present disclosure provides an optical interrogation system comprising an illumination system and an imaging system. The illumination system can illuminate the tissue at various wavelength. The imaging system can image the illuminated tissue at a variety of wavelengths, exploiting a wide range of optical phenomena including, without limitation, selective absorption, fluorescence of different endogenous fluorophores in the tissue, Raman effects, and similar phenomena. The imaging system can also image the tissue section across an area of the tissue section, for example, provide a scan of the entire tissue section.

In some embodiments, the systems and methods of the present disclosure are configured to provide the images of tissue sections so that an assessment can be made of presence or absence of cancer cells or other abnormalities, for example, presence or absence of disease biomarkers or presence or absence of quality issues. In some embodiments, after such assessment, feedback can be provided to the pathology lab; in other embodiments, after such assessment, further sections can be taken (e.g., if cancer cells are detected) for further analysis or no further sections are not taken. (e.g., if no abnormalities are detected). In some embodiments, the systems and methods of the present disclosure can be used for a preliminary diagnosis of abnormalities or disease states in gastroenterology, gynecologic pathology, blood diseases, clotting disorders, microbiology, lung and breast cancers. In some embodiments, the systems and methods of the present disclosure can be used for a preliminary diagnoses of an infectious disease pathology. In some embodiments, the methods of the present disclosure can be used to determine if the tissue sample complies with quality control parameters, such as size, shape, whether the tissue sample is intact etc. In some embodiments, the images can be used non-clinical usage, for example, preclinical toxicology studies, or animal or agricultural analysis in which histology is used.

In some embodiments, the information is obtained (gathered) via imaging using a set of wavelengths and a digital analysis of the results is conducted to make a diagnostic judgment. The tissue sections can be "optically stained" instead of "chemically stained," that is, the present methods and systems utilize imaging techniques that analyze the intrinsic tissue properties (for example, endogenous fluorophores present in tissue), without any staining or special treatment of the tissue samples. Such untreated tissue samples can be analyzed at one or more illumination wavelengths using optical imaging techniques, including, for example, fluorescent spectroscopic imaging, Raman or IR spectroscopic imaging.

An exemplary process of preparation of tissue samples for analysis is described for background. A tissue sample is provided as tissue blocks or sample blocks with tissue embedded in a preservation material such as paraffin. The new block is first subjected to sectioning with relatively thick sections to remove the 0.1 mm-1 mm layer of paraffin wax on top of the tissue sample to expose the tissue under the paraffin wax. This process for removing this paraffin layer and exposing the large cross section of the tissue is referred to as "block facing." The tissue block can then be hydrated and returned to the microtome to be sectioned. The sections of the tissue sample are transferred to and mounted on glass slides for analysis.

The systems and methods of the present disclosure can be used for a preliminary diagnosis, imaging or other information gathering techniques of the tissue sample during the slide preparation process, based on the intrinsic properties of the tissue sample, without any staining or other special treatment. Typically, for a histological analysis, the tissue samples on the slides are stained, such as, with H&E dyes (hematoxylin and eosin) or other (special) stains, to provide the pathologist with a detailed view of the tissue. By staining the cell structures, otherwise transparent tissue sections are colored, enabling a disease diagnosis based on the organization of the cells and shown abnormalities. The systems and methods of the present disclosure utilize one or more optical or imaging techniques (optical staining) to provide a preliminary diagnosis of untreated tissue sample.

Referring to FIG. 1, an optical interrogation system 10 in accordance with some embodiments of the present disclosure can comprise an illumination system 1 and an imaging system 2. The illumination system 1 illuminates the tissue sample 4 (shown in a microtome chuck 3) to aid the analysis of the tissue with the imaging system 2. The illumination system 1 may be used to illuminate the tissue sample in a tissue section and the imaging system 2 is used to perform an imaging analysis of the tissue sample. Based on this analysis, imaging data about the tissue section may be used for diagnostic, quality control or other decision-making purposes. In some embodiments, the optical interrogation system 10 may obtain imaging data from multiple successive tissue sections, and such imaging data may be used for a 3-dimensional reconstruction of tissue sample or for comparison.

In some embodiments, the tissue block may be illuminated with a structured light and the returned light can be used for tissue diagnosis. In some embodiments, the structured light refers to an illumination of the tissue block in a specific pattern. In some embodiments, the structured light may be spatially structured, that is, the tissue is illuminated in a geometrically structured pattern, such as a grid, stripes, concentric circles, etc. In some embodiments, the structured light may be spectrally structured, that is, the tissue is simultaneously illuminated by light having different wavelengths. In some embodiments, the wavelength may be selected from different intensities, bands or colors. In some embodiments, the spectrally structured light can be in the same or predominantly the same intensity range (for example, UV), but have different specific wavelengths within that intensity range. In some embodiments, the spectrally structured light could constitute light predominantly from one or more frequency bands, such bands tailored to the optical properties of tissue molecules, such optical properties including, for example, fluorescence absorption and emission spectra. As an example, a wavelength range with predominantly UV radiation could give rise to strong autofluorescence from certain tissue compartments, facilitating the subsequent diagnostic steps. In some embodiments, the structured light may be sequentially structured, for example, the tissue sample may be illuminated sequentially at various times, with same or different time intervals in between the illuminations.

The illumination system 1 can be configured to illuminate the tissue sample at one or more wavelength over a range of wavelength. Different scanning or diagnostics applications can use different ranges. For example, one or more wavelengths in the 380 nm to 450 nm range can cause certain proteins in the tissue to fluoresces. Another range of the spectrum maybe absorbed by certain proteins in the 620 nm to 4000 nm range. The illumination system 1 can illuminate the tissue sample, so it can be imaged at different contrast conditions. In some embodiments, certain proteins may be illuminated to cause these proteins to fluoresce, which can create contrast between, for example, the tissue sample and the embedding material or between portions of the tissue sample. In some embodiments, the absorption spectra can be used to create dark spots in the tissue sample to create contrast and detect certain proteins using IR wavelengths. In some embodiments, images collected with different lighting conditions that create different contrast maps can be combined to provide richer information to diagnostic algorithms or the user. For example, reference numeral 6 illustrates the block under high contrast lighting where the contrast between the paraffin and tissue is pronounced in accordance with the present disclosure; reference numeral 5 on the other hand illustrates the sample block under low contrast lighting where it is more difficult to differentiate the tissue and paraffin.

The illumination system may include on or more light sources that produce light in the ultraviolet range, visible range, mid-infrared range or infrared range. For example, the UV light can be used to excite natural fluorophores in the tissue, such as NADH (for example, 325 nm to 375 nm) or FAD (for example, 425 nm and 475 nm). Suitable light sources include, but are not limited to, LEDs, lasers, supercontinuum sources, and similar. In some embodiments, the wavelength of the light can be controlled with filters or LEDs with a given range of wavelength emission. In some embodiments, on the image capture side, filters could be provided to enhance the image capture.

The imaging system 2 can include a light detector and can be configured to image the tissue sample for evaluation using one or more imaging methods. The imaging system may be configured for use with various imaging techniques fluorescent spectroscopy, Raman spectroscopy, IR spectroscopy or a combination thereof. Various image processing techniques, as described below, can be utilized for evaluation. Recent Artificial Intelligence based image processing techniques can also be utilized. For example, the optical interrogation system 2 may include a visible light detector, for example, a camera that can take a digital image of the tissue sample. In some embodiments, the imaging system 2 can include one or more of a charge coupled detector, thermal detector, photodector, or a spectrometer, for example, a spectral, multi-spectral or hyperspectral camera. The imaging system 2 can image the illuminated tissue section for a spectroscopic analysis, including, without limitations, fluorescent spectroscopy, Raman spectroscopy, IR spectroscopy or a combination thereof.

In some embodiments, the imaging system may be configured to capture images of the entirety of a tissue sample with micron resolution. In some embodiments, the imaging system may include a light microscope. In some embodiments, the imaging system may include a light microscope. In some embodiments, the imaging system may comprise a whole slide imaging scanner, which can be mounted on a moving stage to take one or more microscopic images of a tissue section.

Transmission of reflectance mode can be utilized. The tissue sample can be illuminated or examined from various angles such as perpendicular to the front face, at a glancing angle, perpendicular to the side face or at a glancing angle or any combination of these.

In some embodiments, the imaging system 2 can comprise a CCD (Charge Coupled Device), a silicon-based multichannel array detector, that can be used as a detector in Raman spectroscopy. In operation, a laser beam illuminates the sample. Electromagnetic radiation from the illuminated spot is collected with a lens and filtered through a monochromator. Elastic scattered radiation at the wavelength corresponding to the laser line (Rayleigh scattering) is filtered out by either a notch filter, edge pass filter, or a band pass filter, while the rest of the collected light is dispersed onto the CCD detector, which provides the spectral distribution of the electromagnetic radiation collected from the sample. This spectral distribution corresponds to the composition of spectral signatures of the materials in the composition of the sample. Analysis of the spectral distribution leads to identification of certain materials in the sample.

The images can be processed and evaluated for a binary decision making of abnormality, e.g., presence of cancer cells or absence of cancer cells. As mentioned above, such analysis relies on the intrinsic properties of the tissue, without any additional chemical treatment. For example, for cancer diagnostics, the illumination system is used to illuminate the tissue sample with UV light (for example, one or more wavelengths in a range between 275 nm and 285 nm), and the returning light can be detected the imaging system 2 (for example, CCD camera). The spectral distribution between a healthy and a malignant tissue are different, for example, there are differences in spatial cellular distribution patterns, concentration of certain proteins, and molecules. The collected data can be either used by an algorithm to decide for the diagnostics or be provided to a human expert to make a decision.

It should be understood that these various illumination and imaging subsystems described herein, and various associated methodologies, are provided by way of example as other illuminations systems can be utilized to enhance differentiating the tissue and the paraffin (or other embedding material), and other imaging systems can be utilized, and other computational systems utilized for preliminary diagnoses, without (or prior to) staining or labeling the tissue. Also, any combination of the illumination systems and/or any combination of the imaging systems can be utilized.

Light (coherent or non-coherent) can be used via absorption, refraction, scattering, Raman scattering, fluorescence, phosphorescence, interference and wavelengths can be continuous or discontinuous distributions anywhere in the spectrum from x-ray to radio waves or any combination of these modalities.

In some embodiments, the presently disclosed methods and systems can be used in connection with a manual process for tissue preparation. In some embodiments, the presently disclosed systems and methods can be incorporated into an automated histology apparatus, as part of an automated system for preparing tissue samples. The automated methods (processes) and systems disclosed herein can automatically face the tissue block via a fully automated tissue sectioning device wherein once faced, the tissue is automatically cut from the block face, automatically transferred to tape and the tape is automatically moved via rollers to advance the cut tissue and position subsequent portions of the tape over the block face for subsequent transfer of cut tissue sections to the tape. In some embodiments, the automated tissue sectioning apparatus also includes a slide station and the tissue sections held on the tape are automatically transported to and transferred in the automated apparatus to glass slides for analysis. In some embodiments, a transfer mechanism, such as tape transfer, can be used to transfer the tissue sections from the microtome to the glass slides. Note transfer medium (also referred to as transport medium) other than tape can be utilized. Therefore, references to tape herein are used for convenience as the systems and methods disclosed herein are fully applicable to other transfer medium not just tape.

Figure 2:
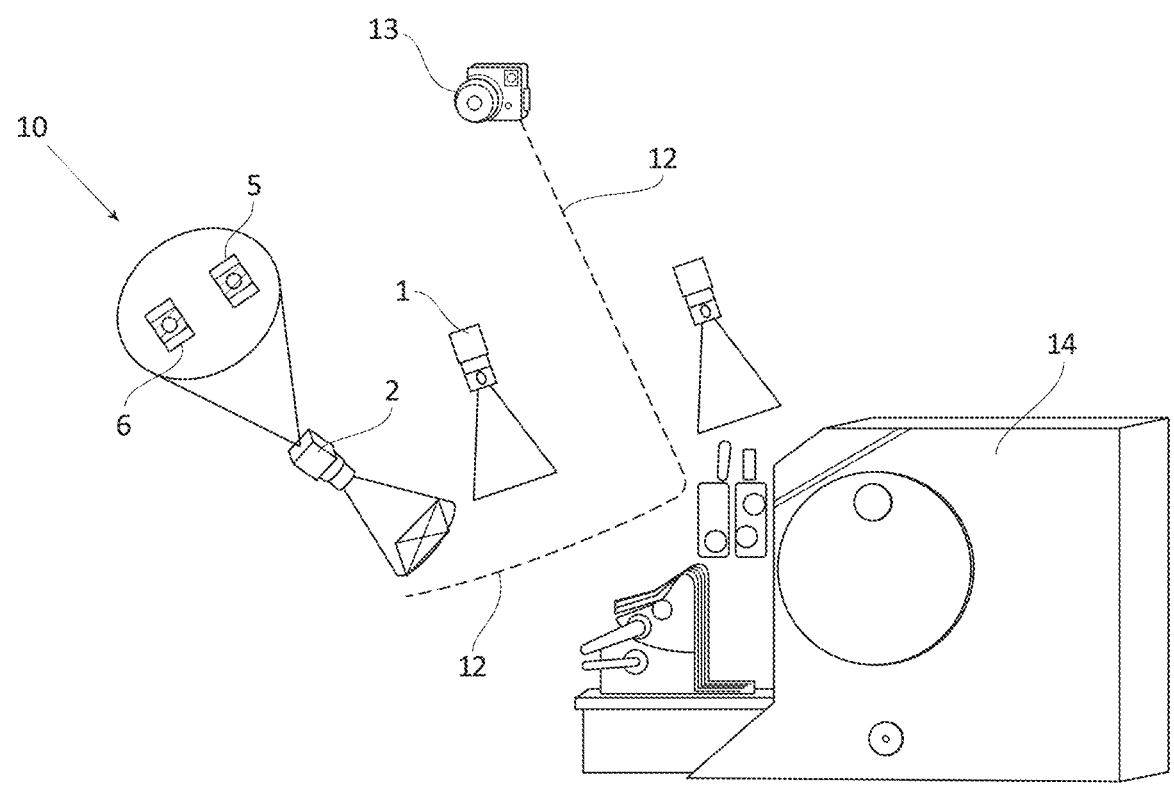
Figure 3:
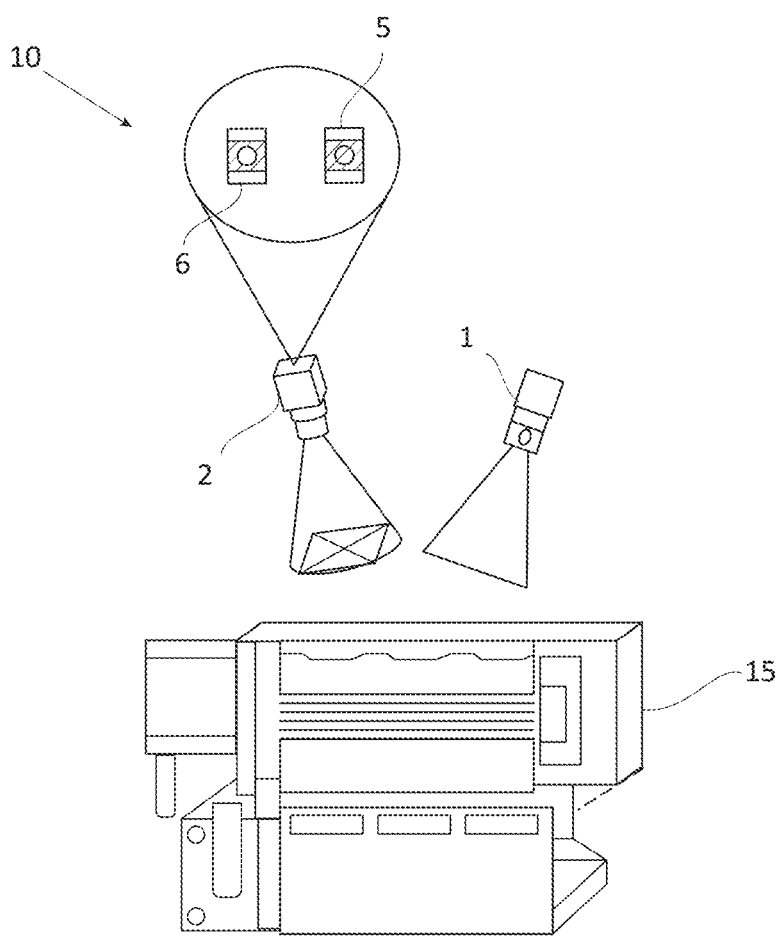

The optical interrogation system 10 can be positioned to visualize the tissue sample at different steps in the sample preparation process. In some embodiments, as shown in FIG. 1, the optical interrogation system may be positioned to illuminate and visualize the sample block 4 when the sample block is supported on the sample supporting chuck 3. In reference to FIG. 2, in some embodiments, the optical interrogation system is positioned to diagnose a cut tissue sample as its being transferred by the transfer medium 12, driven a motorized feed mechanism 13. In reference to FIG. 3, alternatively or in additionally, an optical interrogation system 10 can be positioned to diagnose the tissue section on the slide in the slide station 15. Images can be taken of the cut tissue section on the tape (or other transfer medium) after it is cut from the block and adhered to the tape. Images can additionally or alternatively be taken of the cut tissue section after it has been transferred to the slide. The pathology systems of the present disclosure may include multiple optical interrogation systems in various location or may include a single optical interrogation system that may be moveable between different locations.

In reference to FIG. 4, an exemplary process flow chart 400 for early diagnoses of cut tissue samples is provided. As shown in FIG. 4, in some embodiments, in step 401, the microtome cuts a tissue section from a sample block. In step 402, after the microtome cuts the tissue section from the sample block, the tissue section is illuminated and the cut section is imaged by the imaging system. In some embodiments, the imaging data can be takes on the tissue sample on the sample block. In step 404, the imaging data is analyzed (by computer or human user) to detect abnormalities in the tissue. In step 406, if no abnormality is detected, then more tissue sections may not be required at that time. In step 408, if an abnormality is detected, more tissue sections are taken from the sample block. In step 410, the cut tissue sections from either step 406 or step 408 are transferred to slides for staining and analysis. The microtome can continue to cut and analyze additional sections for abnormalities. If an abnormality is detected in subsequent sections, then additional sections will be obtained. As noted above, in some embodiments, the apparatus can perform the preliminary diagnosis/analysis to provide feedback for human activation of the microtome to obtain more sections. In alternate embodiments, a pathologist in lieu of or in addition to the machine conducts the preliminary diagnosis/analysis during the sectioning/imaging process and controls the activation of the microtome for additional sections.

In the process depicted in the flow chart 500 of FIG. 5, in some embodiments, in step 501, after the microtome cuts the tissue section from the sample block, in step 502, the tissue section is illuminated and imaging data of the cut section is obtained by the imaging system, either at the time of transfer or right after the transfer to the tape. In step 504, the imaging data is analyzed to detect abnormalities in the tissue. In step 506, if no abnormality is detected, then more tissue sections may not be required at that time. In step 508, if an abnormality is detected, more tissue sections are taken from the sample block. In step 510, the cut tissue sections from either step 506 or step 508 are transferred to slides for staining and analysis. Thus, the preliminary diagnosis for the binary decision of the presence or absence of abnormalities and need for additional sections is made on the tape by the machine and/or the pathologist.

In the system/method depicted in the flow chart 600 of FIG. 6, the system/method may be the same as FIG. 5 except the image is taken of the cut section on the slide instead of on the tape. In step 601, in some embodiments, the microtome cuts a tissue section from the sample block. In step 602, the tissue section is illuminated, and imaging data of the cut section is obtained by the imaging system, either at the time of transfer or right after the transfer to the tape. In step 604, the imaging data is analyzed to detect abnormalities in the tissue. In step 606, if no abnormality is detected, then more tissue sections may not be required at that time. In step 608, if an abnormality is detected, more tissue sections are taken from the sample block. In step 610, the cut tissue sections from either step 606 or step 608 are transferred to slides for staining and analysis. Thus, the preliminary diagnosis for the binary decision of the presence or absence of abnormalities and need for additional sections is made on the slide by the machine and/or the pathologist. As mentioned above, a photo of the tissue sample can be taken at one or more multiple locations of the block, the tape and the slide, as well as one or more other locations (for example, on a slide) in addition or instead of the one or more photos takes at the block, the tape or the slide.

Figure 7A:
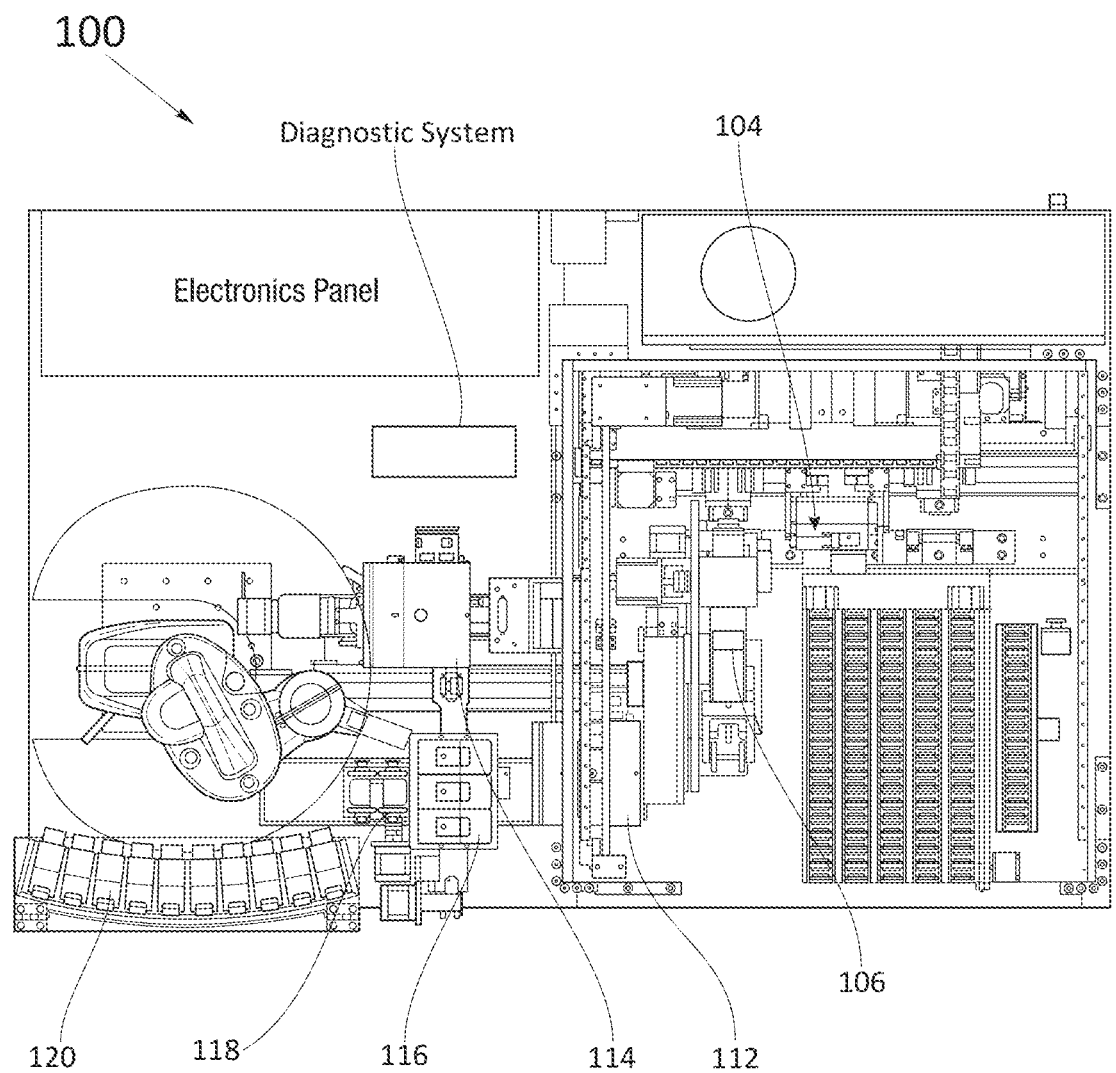
FIG. 7A illustrates an exemplary automated microtome according to the present disclosure.

In reference to FIG. 7A, the optical interrogation system of the present disclosure can be a part of an automated microtomy device. In some embodiments, an automated microtomy device 100 can include a combination of mechanism to receive a sample block, cut a sample/section from a sample block, transfer a sample cut from the block onto a tape to be transferred to a slide for analysis. The combination of mechanism can include at least one microtome 104, transfer medium 106, slide adhesive coater 112, a slide printer 114, slide input racks 116, a slide singulator that picks a slide from a stack of slides 118, and slide output racks 120. This combination of mechanisms works together to prepare the sample on the slide and prepare the slide itself.

The at least one microtome 104 is configured to cut a tissue sample or section from a tissue block, enclosed in a supporting block of preservation material such as paraffin wax. After sectioning, the tissue sections can then be transferred onto the transfer medium 106, such as a tape, for subsequent transfer to the slide station for pathology or histology.

Figure 7B:
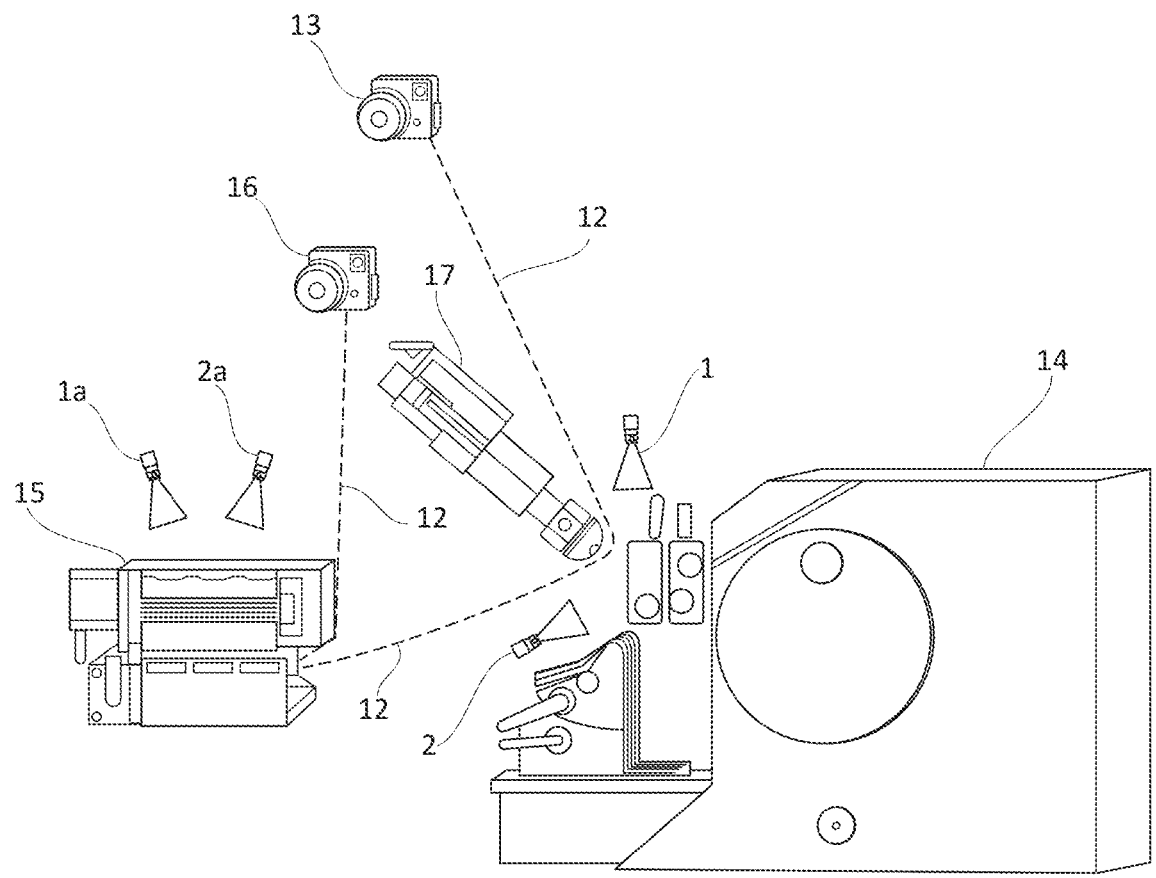
FIG. 7B is a schematic view of one embodiment of the automated tape transfer apparatus of the present disclosure.

As noted above, the optical interrogation system of the present disclosure can be placed in one or more various locations in the automated microtomy device 100. FIG. 7B is a schematic view of one embodiment of an automated tape transfer apparatus (system) to explain an apparatus in which the illumination and image (vision) system and preliminary diagnoses system can be used. The path of the transfer medium 12 for transporting cut tissue sections is illustrated after the block is fully faced. FIG. 7B shows a microtome 14 that is used to hold the sample blocks and cut the sections. The microtome 14 includes a blade (not shown) aligned for cutting slices (or sections) from the face of the tissue block.

In addition to the adhesive transfer medium 12 and the microtome 14, the automated tape transfer apparatus of FIG. 7B includes a motorized feed mechanism 13, a tape applicator 17, a slide station 15 and a take-up mechanism 16. An illumination system 1 and imaging system 2 for the transfer medium 12 (for example, adhesive tape) are shown (schematically) in the drawing. The same (1, 2) or a different illumination and imaging system can be utilized for the sample block. An illumination system 1a and imaging system 2a for the slide are also shown (schematically) in the drawing. However, as noted above, alternatively or additionally, the systems of the present disclosure may include only one optical interrogation system that can be moved between different locations.

The path of the transfer medium 12 starts at the feed mechanism 13 and travels toward the microtome 14 and an applicator end of the tape applicator 17. The transfer medium is then applied to the face of the tissue block and picks a tissue section after it is sectioned from the tissue block. The transfer medium 12 then travels away from the microtome and toward the slide station 15 and finally is stored on the take-up mechanism 16. The controller controlled motorized reels advance the adhesive tape so that the portion of the adhesive tape that includes the cut section moves away from the microtome and sample block and a new portion of the adhesive tape is positioned and adhered to the cutting face for the next section to be cut by the microtome and transferred to the adhesive tape.

Figure 8:
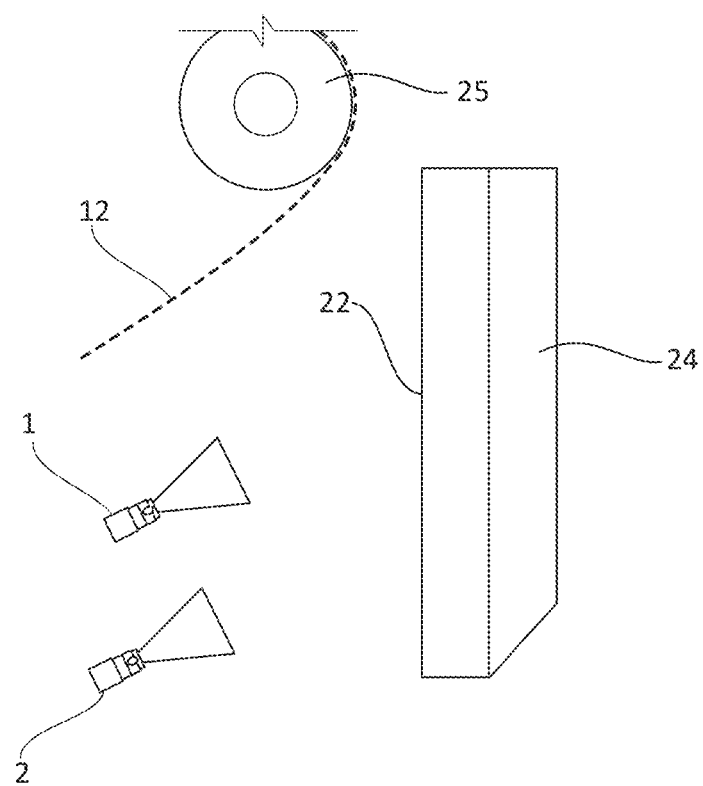
FIG. 8 is a schematic view showing the tape prior to being applied to the face of a sample block.

As the cycle begins, the tape applicator 17 moves towards the cutting face 22 of the sample block of tissue 24 (FIG. 8). This causes the roller member 25 of the tape applicator 17 to press the transfer medium 12, e.g., the adhesive side of the tape if an adhesive tape is utilized, onto the cutting face 22 to cause the transfer medium 12 to adhere and cover the entire cutting face 22 with transfer medium 12. The tape applicator 17 is then retracted in the opposite direction causing the roller member 25 to reset to the original position of where the roller member 25 is clear of the cutting face 22. In alternate embodiments, the cut tissue section is moved into contact with the tape after sectioning by the microtome.

Figure 9:
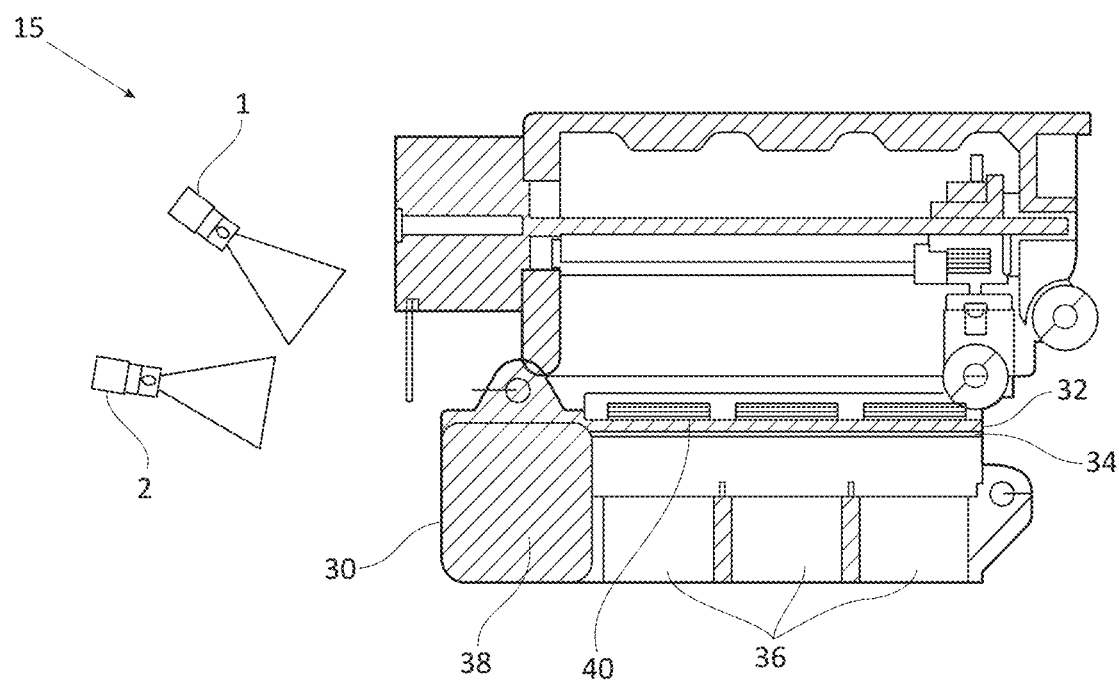
FIG. 9 is a perspective view of a slide station and an optical interrogation system of the automated apparatus of FIG. 6.

FIG. 9 shows the slide station 15 of the automated tape transfer apparatus in more detail. The slide station 15 can be UV station for transfer of the tissue sections that are on the transfer medium 12 to microscope slides 40 that are pre-coated with UV-curable adhesive. A roller may then press the section on the adhesive tape onto the slide. It should be appreciated that although the system of FIG. 6 includes a slide station for transfer to slides, the system in some embodiments does not include a slide station and after transfer of the cut sections to the tape and movement of the tape from the microtome area, the sections can be transferred from the tape to the slides in accordance with other methods, e.g., manual transfer or stored on the tape.

The slide station 15 has a lower portion 30 with spacers 32 that create the slide slots, a support section 34, a UV source 36 and a motor 38. The slide slots created by the spacers 32 and the support section 34 hold the slides 40. The motor 38 is used to translate or move the lower portion 30 of the slide station 15 to adjust the section location on a slide 40 so that the exact location of where the sample section from the tape is deposited on the slide 40 can be controlled. The illumination and imaging system can be provided in or adjacent the slide station for illuminating and taking mages of the tissue section on the slide.

As noted above, the illumination and imaging systems disclosed herein can be utilized with other automated apparatus, tape other than adhesive tape, and apparatus not having an automated slide station as well as in manual systems.

The automated systems provide for using a transfer medium such as, for example, an adhesive tape, or alternatively another transfer medium, to support samples from tissue block cutting. The automated systems and methods also provide for automated subsequent transfer of the samples from the adhesive tape to slides.

The system is described with use of a continuous strip of adhesive tape, it being understood that other transfer medium can be utilized. The adhesive tape as disclosed herein adheres to the cutting face of the sample block prior to sectioning. Subsequent to the adhesive tape adhering to the cutting face, the microtome begins a cutting action. The adhering of the adhesive tape to the cutting face supports the section that is being cut by the microtome. Once the microtome completes the cut, the section that has been cut remains adhered to the adhesive tape. In alternate embodiments, the section can be cut first, followed by adherence to the transfer medium.

It should be understood that the term "adhesive tape" as used herein refers to any type of bonding, including molecular bonding, mechanical bonding, etc., and also can include dry adhesive tapes such as Setex-dA produced by nanoGriptech which provides bonding via van der Waals force (molecular bonding) and whose tape peel force varies greatly on peel angle which minimizes section damage during peeling. The tape preferably leaves no residue, sticks when needed and peels off when needed without damaging the tissue. It should also be noted that the term "continuous strip of adhesive tape" as used herein means that the tape is longer than the amount of adhesive tape used for a single section (a single sample of tissue cut from the tissue block). The adhesive region of the adhesive tape is preferably large enough to fully cover the cutting face of the sample block, i.e., to hold a complete section when it is sliced from the sample block.

Note the tape provides one example of a transport device/system for the slice of tissue. Other transport systems can also be utilized such a robotic arm, a series of cups with water in them, etc. The systems, e.g., illumination systems, imaging systems, etc. described herein are fully applicable to the section (slice) on the various transport systems.

The slides in the slide station can be stably (firmly) held in accordance with some embodiments of the systems described herein.

The automated tape transfer apparatus may include a programmable digital controller, a processor or other type of application specific integrated circuit (ASIC) that is used to control the motion of the automated tape transfer apparatus, communicate with users of the automated tape transfer apparatus and/or communicate with the microtome to which the automated tape transfer apparatus is connected. There are many motions that can be controlled within the automated tape transfer apparatus. Examples of these motions include the movement of the feed mechanism and the take-up mechanism, movement of the lower portion and the translation portion of the slide station, movement of the linear actuator member etc. The controller may also provide information to users of the functions or conditions of the automated tape transfer apparatus such as the number of slides that have been prepared, the number of sections that have been transferred, the amount of tape remaining on the roll, etc. The controller is capable of receiving any types of input (e.g., mechanical, visual, electrical, etc.) to perform its control functions.

In some embodiments, the automated tape transfer apparatus further includes an optical device to inspect the sample block. For example, the microtome may store multiple sample blocks for sectioning. The optical device may be used to assess the condition of the cutting face or determine the location of the tissue within the embedding medium. In one example, a macro image of the cutting face may enable more precise placement of the adhesive tape on the cutting face. Analysis of the cutting face may facilitate automatic trimming of the cutting face to expose the desired tissue for sectioning.

Note the use herein of the term tissue sections or cut sections contemplates that initial sections cut from the sample block may not contain much tissue as they could contain the overlying material, e.g., paraffin or other embedding medium. However, it is the sections of tissue, i.e., the tape regions containing sufficient tissue sections, that are critical for histopathology.

Figure 10:
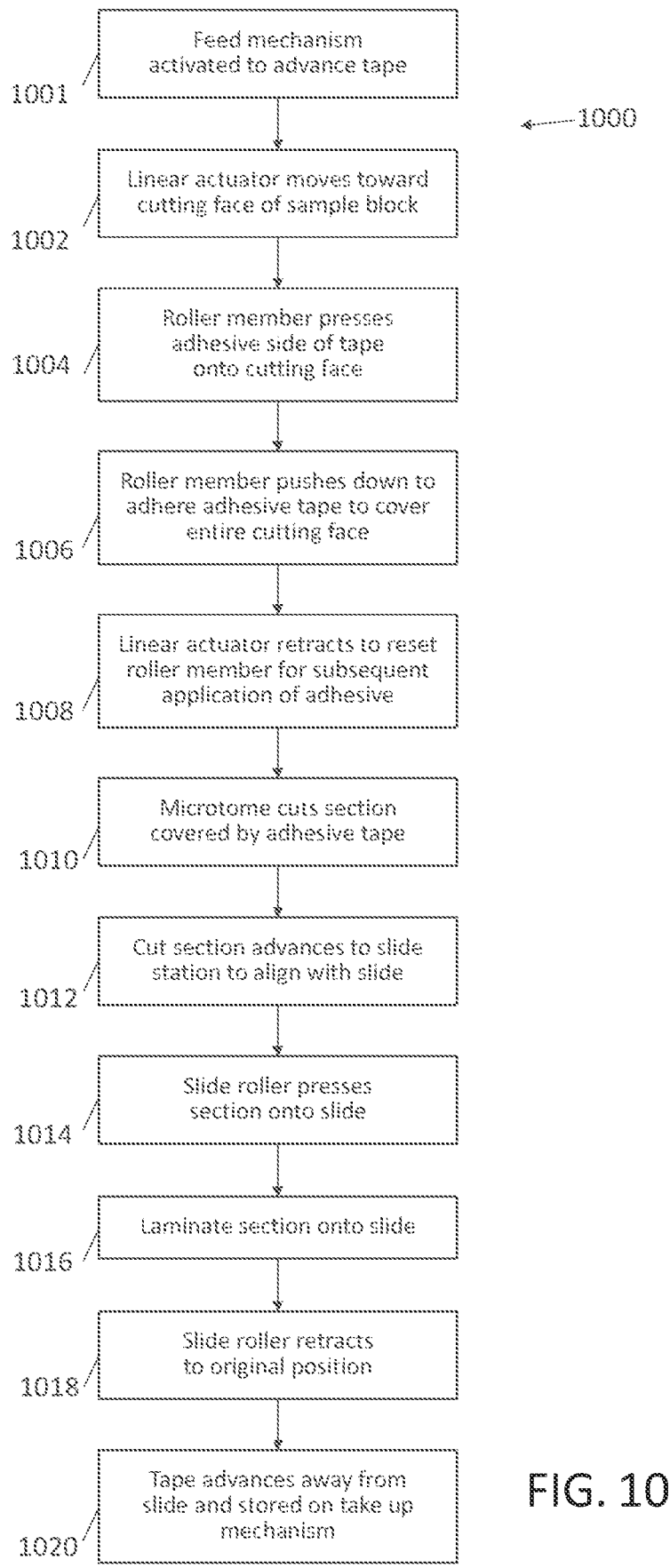
FIGS. 10-12 provide flow charts illustrating various non-limiting examples of the automated methods in accordance present disclosure.

With reference to the flow chart 1000 of FIG. 10, after the tape, e.g., the tape cartridge, is loaded onto the feed mechanism, in some embodiments, in step 1001, the feed mechanism is activated to advance the tape, i.e., a continuous length of adhesive tape. In step 1002, the linear actuator member moves toward the cutting face of the sample block. In step 1004, the roller member presses the adhesive side of the tape onto the cutting face. In step 1006, the roller member pushes down to adhere the adhesive tape to cover the entire cutting face. In step 1008, the linear actuator retracts to reset the roller member for subsequent application of adhesive. In step 1010, the microtome cuts the section covered by adhesive tape. In step 1012, the cut section advances to the slide station in order to align with the slide. In step 1014, the slide roller presses the covered section onto the slide. In step 1016, the tissue section is laminated onto the slide. In step 1018, the slide roller retracts to its original position. In step 1020, the tape advances away from the slide and is stored on the take up mechanism.

Note a single imaging system, e.g., a digital camera, can be utilized to obtain imaging data adjacent the transfer of the cut section to the adhesive of the tape. The same camera(s) can be repositioned during the automated operation to adjacent the slide station to take photos of the slides after transfer of the section to the slide. Alternatively, a different interrogation system can be provided within or adjacent the slide station to take photos after transfer of the section to the slide. As noted above, the imaging system can obtain imaging data of the cut sections after transfer of the cut sections to the tape and after transfer of the cut sections from the tape to the slides, or, alternatively, take photos only after transfer to the tape or only after transfer to the slide. Such imaging data can be taken at the time of transfer, right after transfer or downstream of the transfer (after the tape has advanced past the tape applicators or advanced to the slide station). The photos of the tape and/or cut sections of the tape can also be taken at other times during the tape feed cycle if desired.

Figure 11:
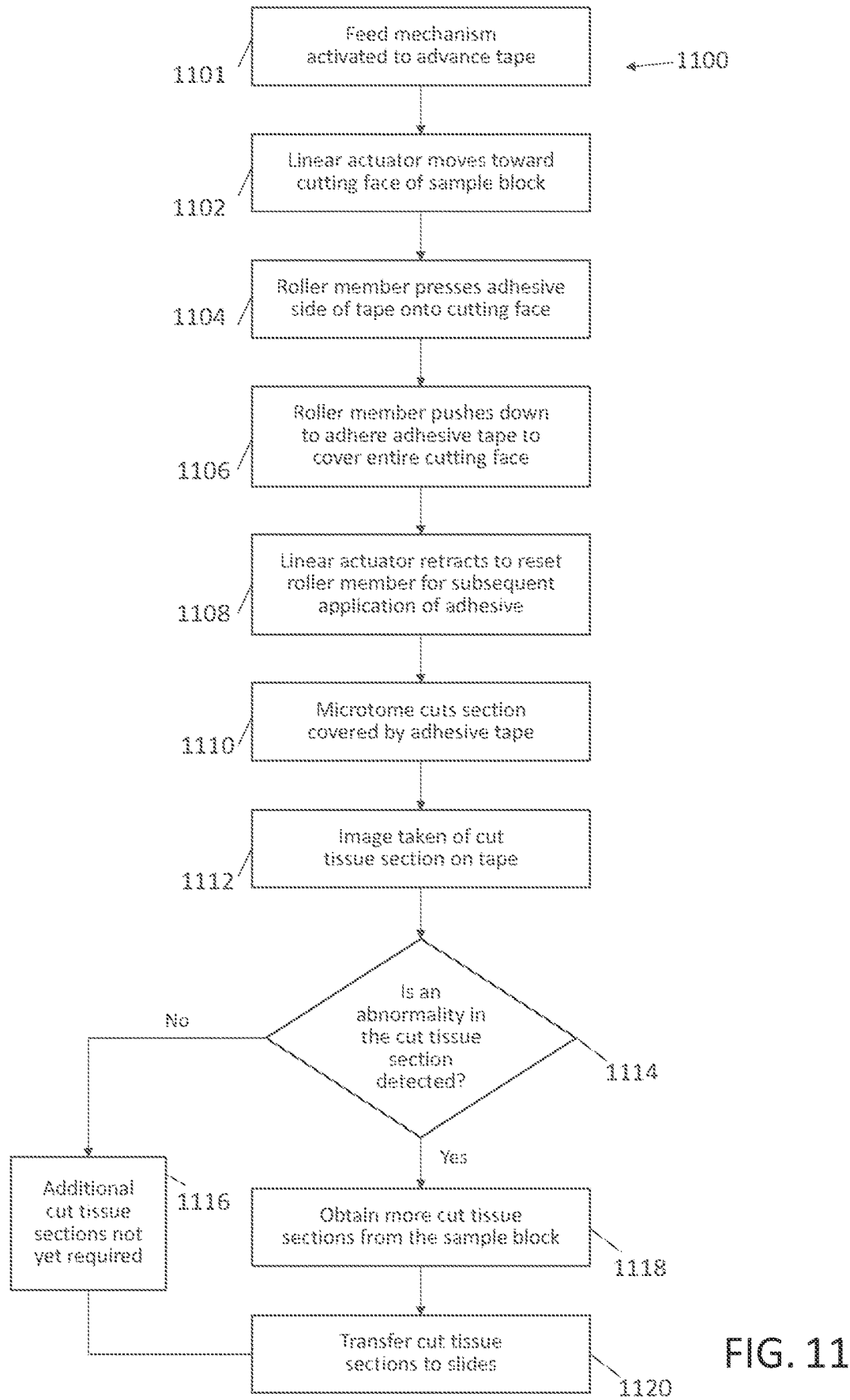

In reference to FIG. 11, an exemplary process flow chart 1100 for detection of abnormalities in cut tissue samples is provided with reference to the flow chart of FIG. 11, after the tape, e.g., the tape cartridge, is loaded onto the feed mechanism, in some embodiments, in step 1101, the feed mechanism 13 is activated to advance the tape, i.e., a continuous length of adhesive tape. In step 1102, the tape applicator 17 is moved toward the cutting face of the sample block. Next, in step 1104, the roller member presses the adhesive side of the tape onto the cutting face. In step 1106, the roller member is then pushed down to adhere the adhesive tape to cover the entire cutting face. In step 1108, the tape applicator 17 is retracted to its original position to reset the roller for subsequent application of adhesive tape to another sample. In step 1110, the microtome then cuts the section covered by the adhesive tape (along a plane parallel or substantially parallel to the cutting face). In step 1112, the section can be illuminated and imaged by the illumination system and optical interrogation system, respectively. In step 1114, the imaging data is analyzed to detect abnormalities in the tissue. In step 1116, if no abnormality is detected, then more tissue sections are not required at that time. In step 1118, if an abnormality is detected, more tissue sections are taken from the sample block and, in step 1120, the cut tissue sections are transferred to slides for staining and analysis. The apparatus will continue to cut and analyze additional sections for abnormalities. If an abnormality is detected in subsequent sections, then additional sections will be obtained. As noted above, in some embodiments, the apparatus can perform the preliminary diagnosis/analysis and automatically initiate additional sections for transfer to slides or alternatively provide feedback for human activation of the apparatus to obtain more sections. In alternate embodiments, a pathologist in lieu of or in addition to the machine conducts the preliminary diagnosis/analysis during the sectioning/imaging process and controls the activation of the apparatus for additional sections.

Figure 12:
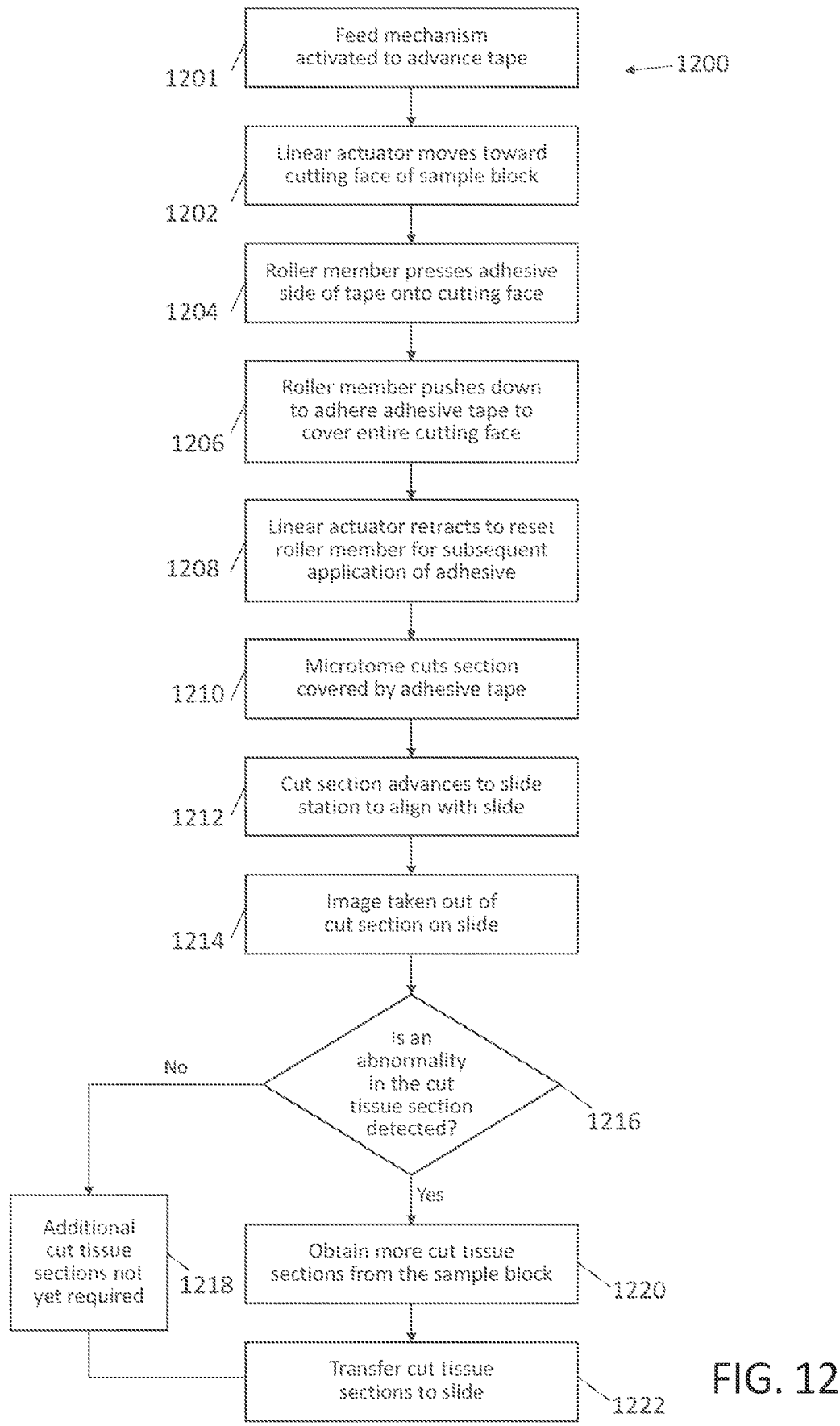

In the system/method depicted in the flow chart 1200 of FIG. 12, the system/method is the same as FIG. 11 except the imaging data of the cut section is obtained on the slide instead of on the tape. In some embodiments, in step 1201, the feed mechanism is activated to advance the tape. In step 1202, the linear actuator member is moved toward the cutting face of the sample block. Next, in step 1204, the roller member presses the adhesive side of the tape onto the cutting face. In step 1206, the roller member is then pushed down to adhere the adhesive tape to cover the entire cutting face. In step 1208, the linear actuator is retracted to its original position to reset the roller for subsequent application of adhesive tape to another sample. In step 1210, the microtome then cuts the section covered by the adhesive tape (along a plane parallel or substantially parallel to the cutting face). In step 1212, the cut section advances to the slide station to align with the slide. In step 1214, the section can be illuminated and imaged by the illumination system and optical interrogation system, respectively. In step 1216, the imaging data is analyzed to detect abnormalities in the tissue. In step 1218, if no abnormality is detected, then more tissue sections are not required at that time. In step 1220, if an abnormality is detected, more tissue sections are taken from the sample block and, in step 1222, the cut tissue sections are transferred to slides for staining and analysis. Thus, the preliminary diagnosis for the binary decision of the presence or absence of abnormalities and need for additional sections is made on the slide by the machine and/or the pathologist as described in conjunction with the chart of FIG. 11.

The analysis of the imaging data in accordance with the flow charts of FIGS. 11 and 12 can be enhanced by use of the illumination and optical interrogation system s described herein.

In some embodiments, i) the section is cut from the tissue sample block and transferred to a transfer medium, such as tape, for subsequent transfer to a slide; ii) the cut section on the tape is imaged or data captured by other methods; and iii) the data is analyzed to provide a preliminary diagnostic judgment.

In some embodiments, i) the section is cut from the tissue sample block and transferred to a slide; ii) the cut section on the slide is imaged or data captured by other methods without staining or labeling of the tissue on the slide; and iii) the data is analyzed to provide a preliminary diagnostic judgment.

In some embodiments, i) the section is cut from the tissue sample block in the automated apparatus and transferred to a transfer medium, such as tape; ii) the cut section is transferred from a transfer medium to a slide; iii) the cut tissue section is imaged or data captured by other methods without staining or labeling of the tissue on the slide; and iv) the data is analyzed to provide a preliminary diagnostic judgment.

In accordance with another aspect of the present disclosure, i) the tissue section prior to being cut from the sample block in the automated apparatus is imaged or data captured by other methods; ii) the data is analyzed to provide a preliminary diagnostic judgment; and iii) the section is then cut from the sample block and transferred to a transfer medium, such as tape, for transport to a slide.

In accordance with another aspect of the present disclosure, a system is provided including one or more imaging systems configured to take an image of i) the tissue sample block containing tissue embedded in an embedding material and/or ii) a tissue section on the tape transfer medium (e.g., tape) after cut from the sample block and/or iii) a tissue section on the slide, all of the images taken to provide preliminary diagnoses without staining or other labeling of the tissue section.

In accordance with another aspect of the automated system of the present disclosure, an automated tape transfer system is provided including a controller, a support for holding a sample block of tissue embedded within an embedding medium, a cutting device configured to cut tissue sections from the sample block, a transfer medium for transporting the cut tissue section from the sample block, and a preliminary diagnostics system including one or more imaging systems (or other information gathering devices/systems) configured to take at least a first image of one or more of i) a block face of the sample block or ii) a cut tissue section from the block face or iii) a tissue carrying medium carrying the cut tissue section or iv) a slide containing the cut tissue section, the images processed to perform a preliminary diagnosis without staining or labeling of the tissue.

In accordance with another aspect of the automated system of the present disclosure, an automated method for transferring cut tissue sections from a tissue sample block and providing a preliminary diagnosis of the tissue section without staining or labeling of the tissue is provided. The automated method comprises:
   a) advancing a tissue section transport medium in an automated system;
   b) illuminating one or more of i) a block face of the sample block or ii) a cut tissue section from the block face or iii) a transfer medium carrying the cut tissue section or iv) a slide containing the cut tissue section, to increase a contrast to enhance differentiation of tissue from an embedding material; and
   c) taking an image of one or more of i) the block face of the sample block or ii) the cut tissue section from the block face or iii) the transfer medium carrying the cut tissue section or iv) the slide containing the cut tissue section, for preliminary diagnosis of the tissue section without staining or labeling of the tissue.

The diagnostic judgments can be made by human and/or machine analysis. In some embodiments, the preliminary diagnoses can be performed by a pathologist analyzing the image cut by the microtome, and the pathologist determines if additional sections need to be taken. In some embodiments, in an automated system, the preliminary diagnoses can be performed by a pathologist analyzing the images during the automated sectioning/tape transfer process of the automated system, and the pathologist determines if additional sections need to be taken In other embodiments, the preliminary diagnosis can be performed by the automated apparatus analyzing the images during the automated sectioning/tape transfer process of the automated system and providing the information to the laboratory and/or automatically initiating action, e.g., automatically taking additional sections, in response to the information discerned in the preliminary diagnosis. In some embodiments, the preliminary diagnoses can be performed both by a pathologist and the machine/apparatus.

The automated system can include a computer system to collect and analyze the imaging data collected by the imaging system 2. The imaging data can be stored for later analysis or comparison if desired. The computer system can have a decision algorithm to determine (in a binary analysis) if the images from the block face, tape or slide shown tissue abnormalities.

Figure 14:
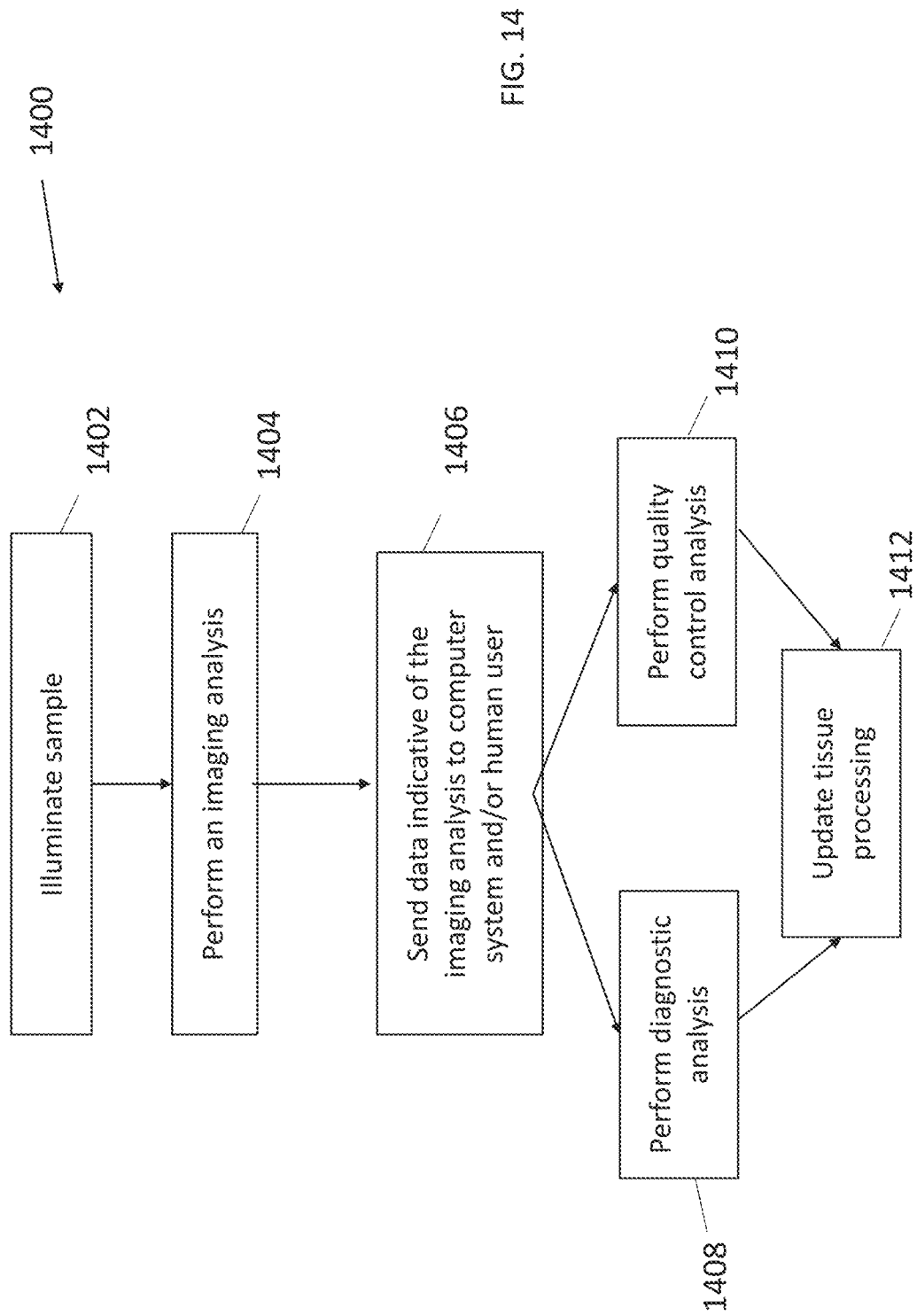
FIG. 14 is a flow chart of an exemplary method of the present disclosure.
Figure 15:
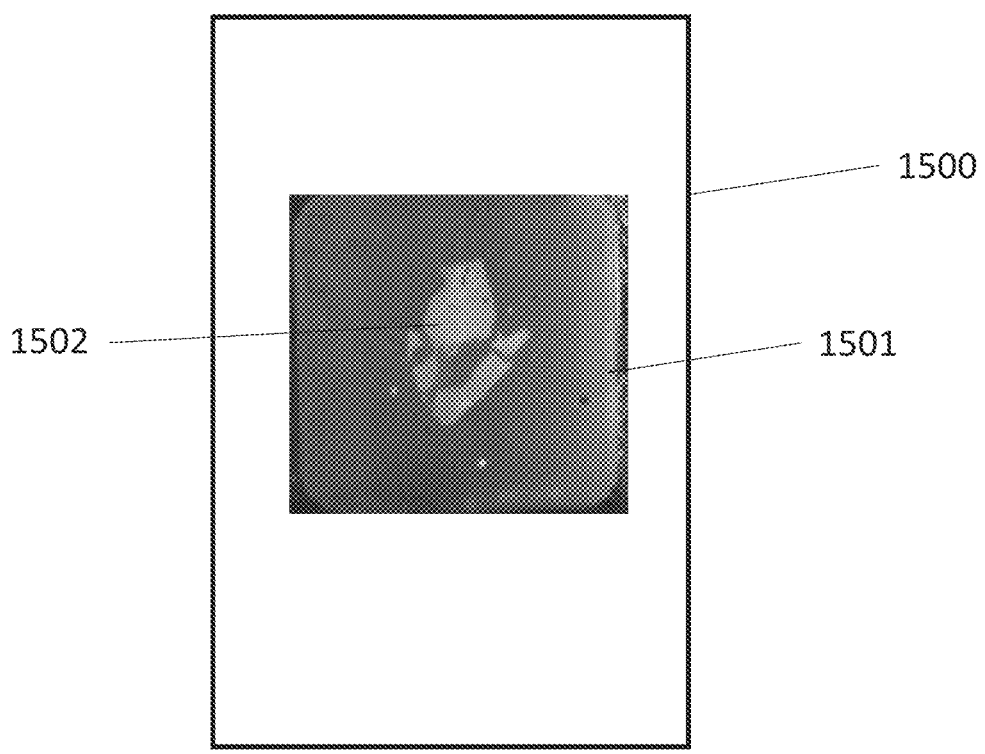
FIG. 15 illustrates an image of an illuminate tissue section in accordance with aspects of the present disclosure.

FIG. 14 presents an exemplary method to determine whether the tissue section comprises one or more abnormalities (either diagnostic algorithm for presence or absence of a disease or by quality control algorithm for presence or absence a defect or quality control issue) are shown. In step 1402, the system can initially illuminate the tissue section using the illumination system. In step 1404, an imaging analysis is performed, for example, to obtain imaging data indicative of one or more images of the illuminated tissue section using the imaging system. The tissue section can be illuminated using the appropriate one or more wavelength of light, e.g. visible, UV, etc. In some embodiment, the imaging data is indicative of the one or more images taken at different magnification levels from macro images to microscopic, and can be captured at different wavelength, for example, to detect fluorescence of different substances. For example, as shown in FIG. 15, a tissue sample 1502 in a tissue section 1501 can be illuminated by UV light so the tissue sample fluoresces so an image of the tissue sample can be taken. As discussed above, this process can be performed when the tissue section is on the tissue block, transfer medium or a slide 1500, or combination thereof.

In some embodiments, the imaging data can be fed into a computer system, or network, and into the machine learning algorithm, in step 1406. In step 1406, a diagnostic analysis can be performed based on one or more biomarkers detected in the tissue. Various biomarkers can be used for the diagnostic analysis, including, but not limited to, cells, proteins, molecules, elements, compounds, and other substances that can indicate presence or absence of a disease of a condition. In some embodiments, the presence or absence of a disease or condition can also be determined based on a visual observation of the tissue sample. By way of a non-limiting example, based upon the received images, a cancerous tissue can be determined based upon biomarkers such as ER, PR, HER(2) indicative of breast cancer; ROS1, p40 indicative of lung cancer; SOX 10 and anti-Mart-1 indicative of dermatological cancer. In some embodiments, in step 1408, the diagnostic analysis includes toxicological analysis of the tissue sample. Additionally or alternatively, in step 1410, the imaging data can be examined for quality control purposes. In some embodiments, the quality control step 1410 can be used to determine if the tissue sample in the tissue section is sufficiently large for analysis, intact or is otherwise of sufficient quality.

In some embodiments, instead of or in addition to digitally analyzing the imaging data by a computer system, etc, the imaging data (for example, as a digital image or a print out) can also be provided to a human user, such as a pathologist. In some embodiments, the one or more images generated in the pathology system of the present disclosure, can be analyzed by themselves or in conjunction with histological image data gathered outside the present pathology system. In some embodiments, the images from the optical interrogation system of the present disclosure can be viewed directly by the pathologist (on a computer) to assist with the diagnostic process. The algorithmic computer analysis may be also supplied to the pathologist to provide assistive input to the pathologist.

In step 1412, based on the analysis of the captured image, the computer system or the human user, individually or together, can provide feedback to the pathology system to update tissue processing protocol. For example, the microtome may be instructed to cut additional tissue sections. In some embodiments, the thickness of the tissue sections may be adjusted. In some embodiments, the image can be used to determine if the tissue is faced deep enough or if deeper cuts are needed. In some embodiments, the image can be used to determine if a critical piece of the tissue is missing or if the tissue sections need to be taken from a different section of the tissue block. In some embodiments, the images may be used to order one or more specific stains. For example, tissue samples are typically stained with H&E for pathology, but other less standard tests (IHC or special stains) can be requested if certain biomarkers are detected.

In some examples, depicted in the flow chart 1400 of FIG. 14, the decision algorithm can be implemented by means of a machine learning algorithm. The machine learning algorithm can be trained to aid in initial diagnostics of the sample. In some examples, the machine learning algorithm can be trained using verified training data (for example, images of cancerous tissue or issues with quality issues). The verified training data can be obtained by human verified data to ensure that the model is accurate. For example, the machine learning algorithm may be provided with images of tissue with biomarkers indicative of breast cancer; lung cancer, or dermatological cancer, or images of tissue samples. The machine learning algorithm may be configured to recognize patterns in the various images inputted. With sufficient input data related to the historical images, the machine learning algorithm may yield a trained model that is be able to receive images from the instant pathology system and identify various biomarkers or quality control issues. For example, based upon the received images, the machine learning algorithm can diagnose the tissue being processed based, for example, on the biomarkers identified in the tissue sample.

The instant method and systems can make use of the machine learning to detect whether the tissue is indicative of disease or condition or has a quality issue, prior to a staining step. For example, the instant algorithm used for quality control can determine if all tissue pieces are present in the block or are not present in the biopsy, thus requiring a new sample before the lab has performed all the time-consuming tests. In some embodiments, the diagnostic algorithm can review the image received from the optical interrogation system and identify one or more biomarkers in the tissue sample, and request additional tissue sections to be obtained from the tissue block.

The machine learning algorithm can be implemented by way of one or more neural networks. The machine learning algorithm can include logistic regression, variational auto-encoding, convolutional neural networks, or other statistical techniques used to identify and discern AD-associated pathologies. The machine learning algorithm can also use Raman scattering models, other scattering models, or optical physics models that are validated a priori. The neural network may comprise a plurality of layers, some of which are defined and some of which are undefined (or hidden). The neural network is a supervised learning neural network.

In some examples, the neural network may include a neural network input layer, one or more neural network middle hidden layers, and a neural network output layer. Each of the neural network layers include a plurality of nodes (or neurons). The nodes of the neural network layers are connected, typically in series. The output of each node in a given neural network layer is connected to the input of one or more nodes in a subsequent neural network layer. Each node is a logical programming unit that performs an activation function (also known as a transfer function) for transforming or manipulating data based on its inputs, a weight (if any) and bias factor(s) (if any) to generate an output. The activation function of each node results in a particular output in response to particular input(s), weight(s) and bias factor(s). The inputs of each node may be scalar, vectors, matrices, objects, data structures and/or other items or references thereto. Each node may store its respective activation function, weight (if any) and bias factors (if any) independent of other nodes. In some example embodiments, the decision of one or more output nodes of the neural network output layer can be calculated or determined using a scoring function and/or decision tree function, using the previously determined weight and bias factors, as is understood in the art.

In some examples, the end user of such images and data derived from the machine learning algorithm can be any of a histotechnician, a lab director, a pathologist, or other professionals. A histotechnicians can rely on the method for quick turnaround time decision making and a quick double quality control, giving the histotechnician a window into an automated sectioning process. A lab director can use the algorithm to ensure the lab processes are working as planned and correctly. A pathologist can use the algorithm to make decisions (such as number of sections needed, type of stain, etc) much quicker because they would not need to wait for the slides to be stained and then presented to them. Thus, the algorithm can create a shortcut in the current lab workflow and paving the way for digital pathology.

Figure 13:
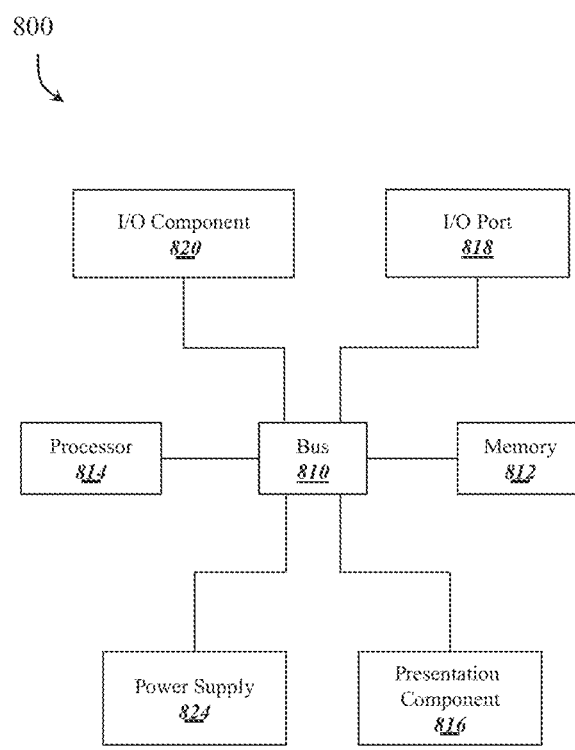
FIG. 13 is a diagrammatic illustration of a high-level architecture for implementing processes in accordance with aspects of the disclosure.

Any suitable computing systems can be used to implement the computing devices and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 800 is depicted in FIG. 13. The computing device 800 is merely an illustrative example of a suitable computing environment and in no way limits the scope of the present disclosure. A "computing device," as represented by FIG. 13, can include a "workstation," a "server," a "laptop," a "desktop," a "hand-held device," a "mobile device," a "tablet computer," or other computing devices, as would be understood by those of skill in the art. Given that the computing device 800 is depicted for illustrative purposes, embodiments of the present disclosure may utilize any number of computing devices 800 in any number of different ways to implement a single embodiment of the present disclosure. Accordingly, embodiments of the present disclosure are not limited to a single computing device 800, as would be appreciated by one with skill in the art, nor are they limited to a single type of implementation or configuration of the example computing device 800.

The computing device 800 can include a bus 810 that can be coupled to one or more of the following illustrative components, directly or indirectly: a memory 812, one or more processors 814, one or more presentation components 816, input/output ports 818, input/output components 820, and a power supply 824. One of skill in the art will appreciate that the bus 810 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 8 is merely illustrative of an exemplary computing device that can be used to implement one or more embodiments of the present disclosure, and in no way limits the disclosure.

The computing device 800 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 800.

The memory 812 can include computer-storage media in the form of volatile and/or nonvolatile memory. The memory 812 may be removable, non-removable, or any combination thereof. Exemplary hardware devices are devices such as hard drives, solid-state memory, optical-disc drives, and the like. The computing device 800 can include one or more processors that read data from components such as the memory 812, the various I/O components 816, etc. Presentation component(s) 816 present data indications to a user or other device. Exemplary presentation components include a display device, speaker, printing component, vibrating component, etc.

The I/O ports 818 can enable the computing device 800 to be logically coupled to other devices, such as I/O components 820. Some of the I/O components 820 can be built into the computing device 800. Examples of such I/O components 820 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

While the above description contains many specifics, those specifics should not be construed as limitations on the scope of the disclosure, but merely as exemplifications of preferred embodiments thereof. Those skilled in the art will envision many other possible variations that are within the scope and spirit of the disclosures. It is also to be understood that the following claims are to cover all generic and specific features of the disclosure described herein, and all statements of the scope of the disclosure which, as a matter of language, might be said to fall therebetween.

What is claimed is:

1. A system for optical interrogation of tissue samples, the system comprising:
    a microtome configured to section one or more tissue sections from a tissue block, the one or more tissue sections comprising one or more tissue samples;
    a transfer medium configured to gather the one or more tissue sections and to transfer the one or more tissue sections to one or more slides; and
    an optical interrogation system comprising an illumination system configured to illuminate the one or more tissue sections and an imaging system configured to perform an imaging analysis on the one or more tissue sections illuminated with the illumination system, wherein the optical interrogation system is mounted on a moveable stage such that the imaging analysis of the one or more tissue sections is performed at the microtome, on the transfer medium, or on the one or more slides.

2. The system of claim 1, wherein the illumination system is configured to illuminate the one or more tissue sections with structured light.

3. The system of claim 1, wherein the imaging system is configured to perform the imaging analysis with light microscopic resolution.

4. The system of claim 1, wherein the imaging system comprises a microscopic scanner.

5. A system for optical interrogation of tissue samples, the system comprising:
    a microtome configured to section one or more tissue sections from a tissue block for transfer to one or more slides by a transfer medium, the one or more tissue sections comprising one or more tissue samples;
    an optical interrogation system comprising an illumination system configured to illuminate the one or more tissue sections and an imaging system configured to perform an imaging analysis of the one or more tissue sections illuminated with the illumination system, wherein the optical interrogation system is mounted on a moveable stage such that the imaging analysis of the one or more tissue sections is performed at the microtome, on the transfer medium, or on the one or more slides; and
    a processor in communication with the optical interrogation system, the processor being programmed to receive imaging data indicative of the imaging analysis from the optical interrogation system and to present the imaging data for an analysis of the one or more tissue sections to determine a presence or an absence of one or more abnormalities.

6. The system of claim 5, wherein the processor is programmed to perform an analysis of the imaging data to determine a presence or an absence of one or more abnormalities in the one or more tissue samples of the one or more tissue sections.

7. The system of claim 5 further comprising a transfer medium configured to gather the one or more tissue sections and to transfer the one or more tissue sections to one or more slides.

8. The system of claim 5, wherein one or more abnormalities comprise one or more biomarkers indicative of a disease, a quality control issue or a combination thereof.

9. The system of claim 5, wherein the processor is programmed to perform a diagnostic algorithm to generate a diagnostic value for the one or more tissue samples.

10. The system of claim 9, the diagnostic value being indicative of a presence or an absence of a disease.

11. The system of claim 10, wherein the processor is further programmed to obtain additional one or more tissue sections if the diagnostic value is indicative of the presence of a disease.

12. The system of claim 5, wherein the processor is configured to identify from the imaging data one or more biomarkers indicative of a disease in the one or more tissue samples and assign a diagnostic value for the one or more tissue samples based on the one or more biomarkers.

13. The system of claim 5, wherein the processor is programmed to perform a quality control algorithm to identify one or more quality control issues.

14. The system of claim 5, wherein the illumination system is configured to illuminate the one or more tissue sections with structured light.

15. The system of claim 5, wherein the imaging system is configured to perform the imaging analysis with light microscopic resolution.

16. The system of claim 5, wherein the imaging data comprises one or more images of the one or more tissue sections.

17. The system of claim 5, wherein the processor is configured to present to a human user the imaging data as one or more images of the one or more tissue sections.

18. A system for optical interrogation of tissue samples, the system comprising:
    a microtome configured to section one or more tissue sections from a tissue block, the one or more tissue sections comprising one or more tissue samples;
    a transfer medium configured to gather the one or more tissue sections and to transfer the one or more tissue sections to one or more slides;
    an optical interrogation system comprising an illumination system configured to illuminate the one or more tissue sections and an imaging system configured to perform an imaging analysis on the one or more tissue sections illuminated with the illumination system, wherein the optical interrogation system is mounted on a moveable stage such that the imaging analysis of the one or more tissue sections is performed at the microtome, on the transfer medium, or on the one or more slides; and
    a processor being programmed to receive imaging data indicative of the imaging analysis from the optical interrogation system, to perform an analysis of the one or more tissue samples for one or more biomarkers indicative of a disease, and to cause the microtome to section additional one or more tissue sections if the one or more biomarkers are detected.

* * * * *